(12) United States Patent
Sawada

(10) Patent No.: US 8,890,441 B2
(45) Date of Patent: Nov. 18, 2014

(54) LOAD DRIVING DEVICE AND LED LIGHTING APPLIANCE THEREWITH

(71) Applicant: Rohm Co., Ltd., Kyoto (JP)

(72) Inventor: Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/024,810

(22) Filed: Sep. 12, 2013

(65) Prior Publication Data

US 2014/0077724 A1 Mar. 20, 2014

(30) Foreign Application Priority Data

Sep. 14, 2012 (JP) ................................. 2012-202276

(51) Int. Cl.
*H05B 33/08* (2006.01)
*H02M 3/156* (2006.01)
*H02M 3/157* (2006.01)

(52) U.S. Cl.
CPC ........... *H05B 33/0815* (2013.01); *H02M 3/157* (2013.01); *H05B 33/08* (2013.01); *H02M 3/156* (2013.01)
USPC ........ 315/307; 315/209 R; 315/247; 315/291; 323/282; 323/283; 323/304; 323/311

(58) Field of Classification Search
USPC ............. 315/209 R, 246, 247, 291, 307, 308; 323/211, 282, 283, 304, 311, 312
See application file for complete search history.

(56) References Cited

U.S. PATENT DOCUMENTS

| 5,134,355 A * | 7/1992 | Hastings ....................... 323/211 |
| 7,164,375 B2 * | 1/2007 | Sawada .......................... 341/143 |
| 2012/0014148 A1 * | 1/2012 | Li et al. ........................... 363/78 |

FOREIGN PATENT DOCUMENTS

JP   2010-110190   5/2010

* cited by examiner

*Primary Examiner* — Douglas W Owens
*Assistant Examiner* — Thai Pham
(74) *Attorney, Agent, or Firm* — Fish & Richardson P.C.

(57) ABSTRACT

A load driving device has a switch N1, a driver that performs on/off control of the switch in accordance with SWON, a comparator that compares Vdet1 with Vth, and based on a result of the comparison, generates IPEAKDET, an ADC that converts Vdet1 into ADCOUT, a DAC that converts IPEAKSET into Vth, and a logic portion that, upon receiving inputs of IPEAKDET and ADCOUT, outputs SWON and IPEAKSET. The logic portion includes a computation circuit that calculates Y1 by using a computation equation expressed by Y1=AVE×α+Δ×Ton/2 (where Y1: a signal value of IPEAKSET; AVE: an average current set value of an output current; α: an adjustment coefficient for AVE; Ton: an on period; Δ: a change rate of AVCOUT). The computation circuit determines α in accordance with computation mode setting signals ISO and PFC.

19 Claims, 24 Drawing Sheets

US 8,890,441 B2

LOAD DRIVING DEVICE AND LED LIGHTING APPLIANCE THEREWITH

CROSS-REFERENCE TO RELATED APPLICATIONS

This application is based on and claims the benefit of priority from the following Japanese Patent Application, the contents of which are hereby incorporated by reference.

(1) Japanese Patent Application No. 2012-202276 (filing date: Sep. 14, 2012)

BACKGROUND OF THE INVENTION

1. Field of the Invention

The present invention relates to a load driving device that performs switching control of an output current flowing through a load.

2. Description of Related Art

FIGS. 22 to 24 are diagrams showing first to third conventional examples of an LED lighting appliance using a light emitting diode (LED) as a light source, respectively. In an LED lighting appliance 200, as a switching control method for controlling an output current ILED flowing through a light emitting diode 201, a so-called peak current control method is adopted. On the other hand, in each of LED lighting appliances 300 and 400, as a switching control method for controlling an output current ILED, a so-called feedback control method is adopted. Each of the LED lighting appliances 200 and 300 is of a non-insulated type (buck type), and the LED lighting appliance 400 is of an insulated type (fly-back type).

One example of prior art related to the above is described in JP-A-2010-110190.

The conventional peak current control method, however, has been problematic in that an input voltage characteristic of the output current ILED is poor, so that the output current ILED fluctuates depending on a variation in an input voltage Vin. Furthermore, the conventional peak current control method has been problematic in that an output voltage characteristic of the output current ILED is also poor, and thus an appropriate peak current should be set in accordance with an output voltage Vout (the number of series stages of a light emitting diode 201) of the LED lighting appliance 200. Moreover, the conventional peak current control method has been problematic also in that the output current ILED varies in accordance with an inductance value of a coil 203.

On the other hand, the conventional feedback control method, though capable of solving the above-described problems, has been problematic in that, compared with the peak current control method, this method requires more complicated and larger circuitry. Particularly in a case of an LED lighting appliance of the insulated type, this method requires that, as a portion used to perform signal transmission from a secondary side to a primary side, a photocoupler 411 whose lifespan is short be provided, and thus has been problematic.

SUMMARY OF THE INVENTION

In view of the above-described problems found by the inventors of the present application, the present invention has as its object to provide a load driving device capable of appropriately performing switching control of an output current flowing through a load.

In order to achieve the above-described object, a load driving device according to the present invention has a switch for performing switching control of an output current flowing through a load, a driver that performs on/off control of the switch in accordance with a switch control signal, a comparator that compares a current detection voltage corresponding to a sense current flowing through the switch with a current peak setting voltage, and based on a result of the comparison, generates a current peak detection signal, an AD converter that converts the current detection voltage into a current detection signal, a DA converter that converts a current peak setting signal into the current peak setting voltage, and a logic portion that, upon receiving inputs of the current peak detection signal and the current detection signal, outputs the switch control signal and the current peak setting signal. In the load driving device, the logic portion includes a computation circuit that calculates a signal value of the current peak setting signal by using a computation equation expressed by $Y1 = AVE \times \alpha + \Delta \times Ton/2$, where a signal value of the current peak setting signal is denoted as $Y1$, an average current set value of the output current as AVE, an adjustment coefficient for the average current set value as $\alpha$, an on period of the switch as Ton, and a change rate of the current detection signal in the on period of the switch as $\Delta$, and the computation circuit determines the adjustment coefficient in accordance with a computation mode setting signal.

Other features, constituent components, operational steps, advantages, and characteristics of the present invention will be further clarified by the following detailed descriptions of best modes and appended drawings related thereto.

DETAILED DESCRIPTION OF PREFERRED EMBODIMENTS

<LED Lighting Appliance>

FIGS. 1 to 4 are diagrams showing a first configuration example (non-insulated type (buck type); power factor correction control disabled), a second configuration example (non-insulated type (buck type); power factor correction control enabled), a third configuration example (insulated type (fly-back type); power factor correction control disabled), and a fourth configuration example (insulated type (fly-back type); power factor correction control enabled) of an LED lighting appliance, respectively. An LED lighting appliance X of each of the first to fourth configuration examples has a light emitting diode driving device 1 and a light emitting diode 2.

The light emitting diode driving device 1 is one form of a load driving device, performing switching control of an output current ILED flowing through the light emitting diode 2 as a load, and is composed of a semiconductor device 10 and a plurality of discrete components that are externally connected to the semiconductor device 10.

The semiconductor device 10 is a monolithic semiconductor integrated circuit device (so-called LED driver IC) used in common in all of the first to fourth configuration examples and has external terminals T1 to T8 as portions used to establish an electrical connection with the exterior. An internal configuration and operations of the semiconductor device 10 are to be described in detail later.

Next, the discrete components externally connected to the semiconductor device 10 are described individually for each of the first to fourth configuration examples.

Figure 1:
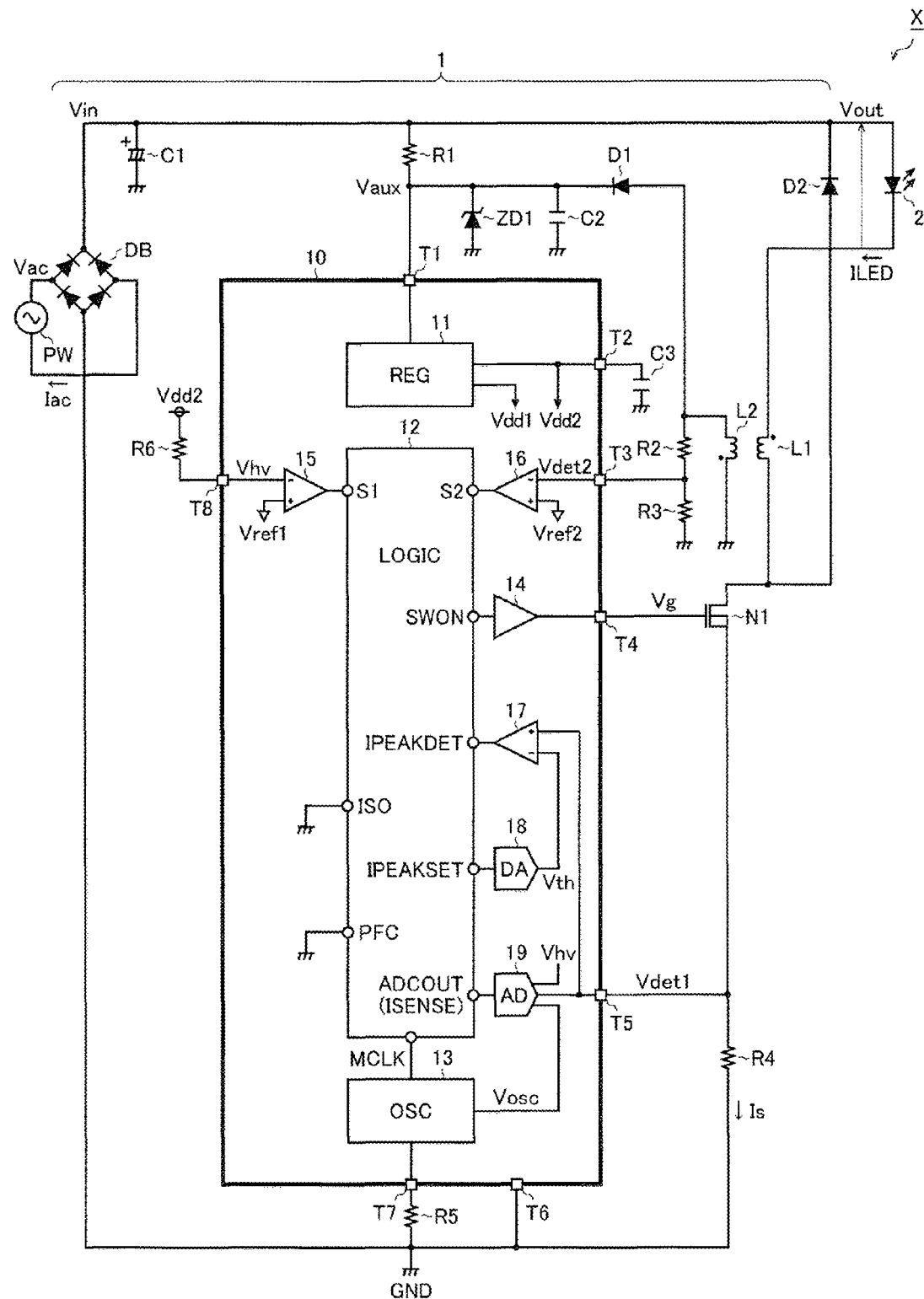
FIG. 1 is a diagram showing a first configuration example (non-insulated type; power factor correction control disabled) of an LED lighting appliance.

First, with reference to FIG. 1, a description is given of the first configuration example. In the first configuration example, an N-channel type MOS (metal oxide semiconductor) field-effect transistor N1, a diode bridge DB, resistors R1 to R6, capacitors C1 to C3, diodes D1 and D2, a Zener diode ZD1, and coils L1 and L2 are externally connected to the semiconductor device 10.

A drain of the transistor N1 is connected a first end of the coil L1 and to an anode of the diode D2. A second end of the coil L1 is connected to a cathode of the light emitting diode 2. A cathode of the diode D2 is connected to an anode of the light emitting diode 2. A source and a back gate of the transistor N1 are connected to the external terminal T5. A gate of the transistor N1 is connected to the external terminal T4.

A first input end of the diode bridge DB is connected to a first end (corresponding to an application end of an alternating current voltage Vac) of a commercial alternating current power source PW. A second input end of the diode bridge DB is connected to a second end of the commercial alternating current power source PW. A first output end (corresponding to an application end of an input voltage Vin) of the diode bridge DB is connected to the anode of the light emitting diode 2. A second output end of the diode bridge DB is connected to an application end of a ground voltage GND.

A first end of the capacitor C1 and a first end of the resistor R1 are both connected to the first output end of the diode bridge DB. A second end of the capacitor C1 is connected to an application end of the ground voltage GND. A second end of the resistor R1, a cathode of the diode D1, a cathode of the Zener diode ZD1, and a first end of the capacitor C2 are all connected to the external terminal T1. An anode of the Zener diode ZD1 and a second end of the capacitor C2 are each connected to an application end of the ground voltage GND. An anode of the diode D1 is connected to a first end of the resistor R2 and to a first end of the coil L2. A second end of the resistor R2 and a first end of the resistor R3 are both connected to the external terminal T3. A second end of the resistor R3 and a second end of the coil L2 are each connected to an application end of the ground voltage GND. A first end of the capacitor C3 is connected to the external terminal T2. A second end of the capacitor C3 is connected to an application end of the ground voltage GND. A first end of the resistor R4 is connected to the external terminal T5. A second end of the resistor R4 is connected to the application end of the ground voltage GND. A first end of the resistor R5 is connected to the external terminal T7. A second end of the resistor R5 is connected to the application end of the ground voltage GND. A first end of the resistor R6 is connected to an application end of a second power source voltage Vdd2. A second end of the resistor R6 is connected to the external terminal T8. The external terminal T6 is connected to the application end of the ground voltage GND.

In the light emitting diode driving device 1 configured as above, the transistor N1 corresponds to a switch for performing switching control of the output current ILED flowing through the light emitting diode 2. When the transistor N1 is in an on state, the output current ILED (corresponding to a sense current Is) flows from the application end of the input voltage Vin toward the application end of the ground voltage GND via the light emitting diode 2, the coil L1, the transistor N1, and the resistor R4. On the other hand, when the transistor N1 is in an off state, the output current ILED flows in a loop via the coil L1, the diode D2, and the light emitting diode 2.

The diode bridge DB is a full-wave rectification circuit that generates the input voltage Vin by performing full-wave rectification of the alternating current voltage Vac. The capacitor C1 is a smoothing element that smoothes the input voltage Vin. As the capacitor C1, an electrolytic capacitor (for example, 10 μF) can be favorably used. A filter circuit for removing noise or a surge may be provided in a stage preceding the diode bridge DB.

The resistor R1, the Zener diode ZD1, the diode D1, the capacitor C2, and the coil L2 constitute a power source circuit that applies an external voltage Vaux to the semiconductor device 10. At a startup of the semiconductor device 10, a charging current of the capacitor C2 is drawn in from the application end of the input voltage Vin via the resistor R1, and thus the external voltage Vaux is generated. On the other hand, after the startup of the semiconductor device 10, a charging current of the capacitor C2 is drawn in from the coil L2, which, together with the coil L1, constitutes a transformer, via the diode D1, and thus the external voltage Vaux is generated. A winding ratio between the coils L1 and L2 could be set as appropriate in view of a level of the external voltage Vaux required for an operation of the semiconductor device 10.

The light emitting diode driving device 1 of the first configuration example is favorably used for, for example, a low-power (25 W or less) LED lighting appliance (such as a light bulb or illuminations).

Figure 2:
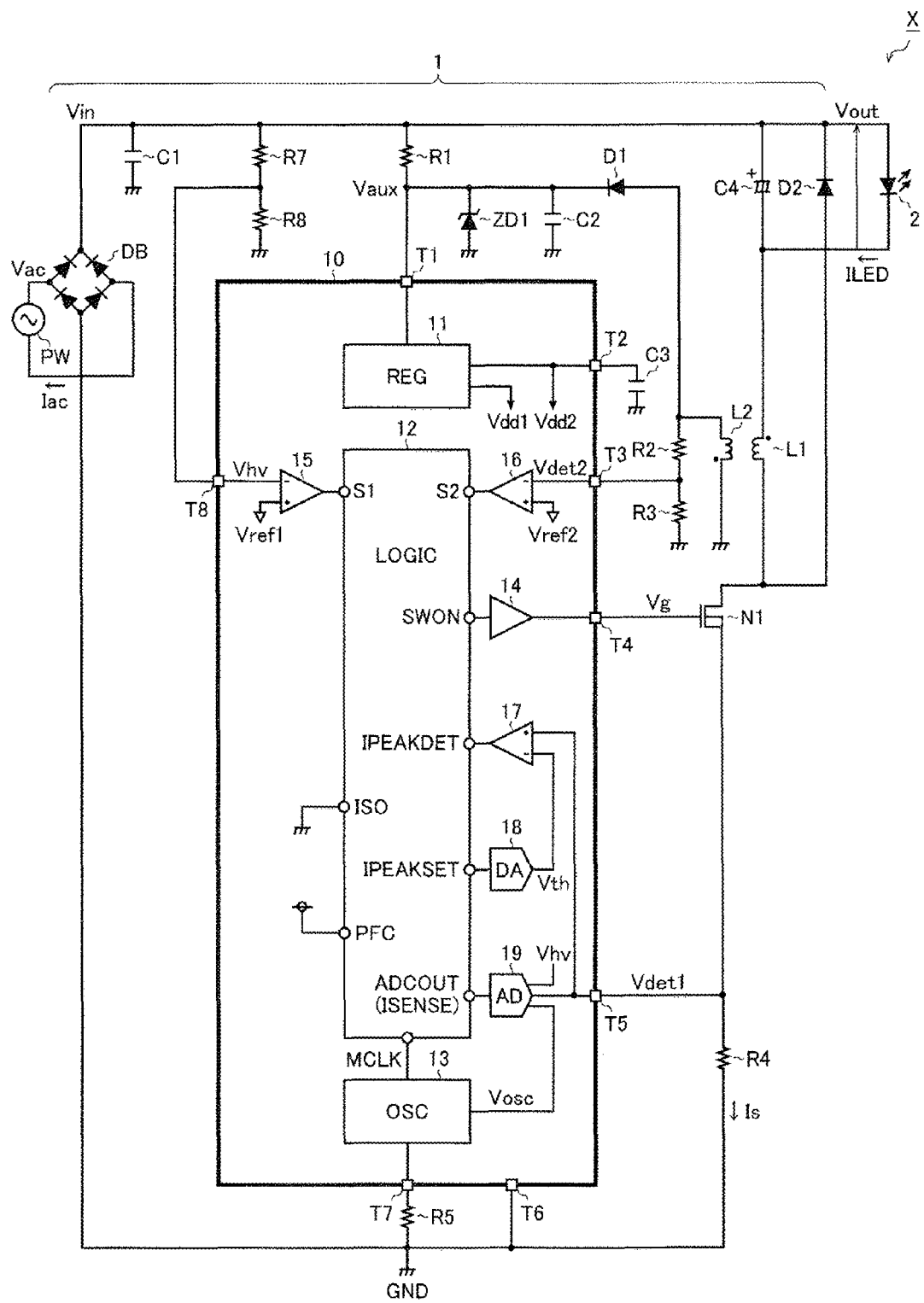
FIG. 2 is a diagram showing a second configuration example (non-insulated type; power factor correction control enabled) of the LED lighting appliance.

Next, with reference to FIG. 2, a description is given of the second configuration example. In the second configuration example, the discrete components (N1, DB, R1 to R5, R7, R8, C1 to C4, D1, D2, ZD1, L1, L2) externally connected to the semiconductor device 10 are mostly the same as those in the first configuration example. The second configuration example, however, has three differences from the first configuration example.

A first difference is that, as a capacitor C1 for smoothing an input voltage Vin, instead of an electrolytic capacitor, a ceramic capacitor (for example, 0.1 µF) is used. A second difference is that, across a light emitting diode 2, a capacitor C4 for smoothing an output voltage Vout (a voltage across the light emitting diode 2) is connected. As the capacitor C4, an electrolytic capacitor (for example, 10 µF) can be used. A third difference is that, in place of the resistor R6 for pulling up the external terminal T8 to the second power source voltage Vdd2, resistors R7 and R8 for dividing the input voltage Vin and applying a resulting voltage to the external terminal T8 are externally connected to the semiconductor device 10. A voltage division ratio between the resistors R7 and R8 could be adjusted as appropriate in consideration of an amplitude level of the input voltage Vin and input dynamic ranges of a comparator 15 and an AD converter 19.

The light emitting diode driving device 1 of the second configuration example is favorably used for, for example, a medium-power (25 W to 100 W) LED lighting appliance (for indoor lighting, outdoor lighting, or the like).

Figure 3:
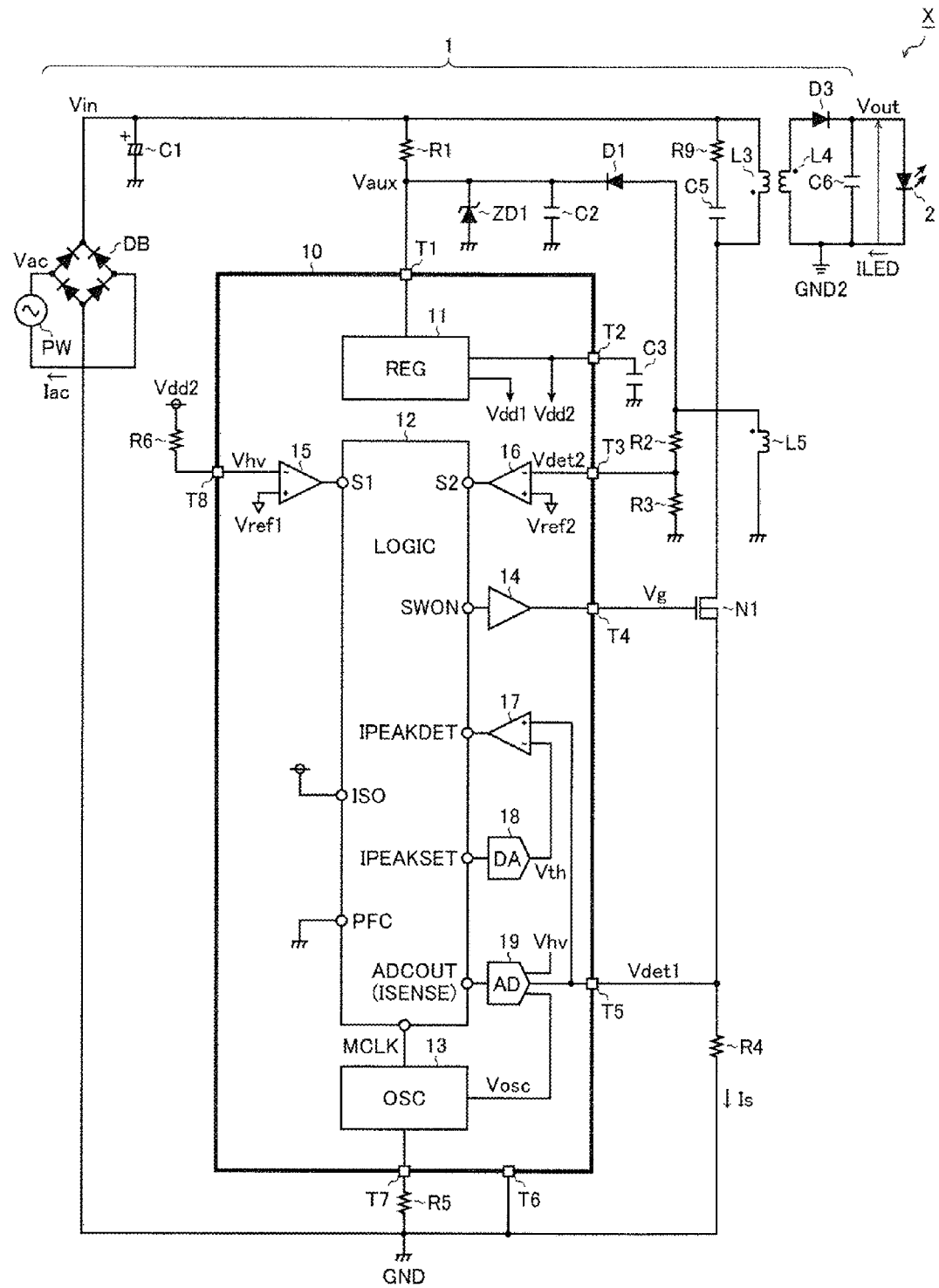
FIG. 3 is a diagram showing a third configuration example (insulated type; power factor correction control disabled) of the LED lighting appliance.

Next, with reference to FIG. 3, a description is given of the third configuration example. In the third configuration example, the discrete components (N1, DB, R1 to R6, R9, C1 to C3, C5, C6, D1, D3, ZD1, L3 to L5) externally connected to the semiconductor device 10 are mostly the same as those in the first configuration example. In the third configuration example, however, an output stage is fundamentally different in configuration from that in the first configuration example, and in place of the coils L1 and L2 and the diode D2, coils L3 to L5, a resistor R9, capacitors C5 and C6, and a diode D3 are externally connected to the semiconductor device 10.

A first end of the coil L3 is connected to an application end of an input voltage Vin. A second end of the coil L3 is connected to a drain of a transistor N1. The resistor R9 and the capacitor C5 are connected in series across the coil L3. A first end of the coil L4 is connected to an anode of the diode D3. A second end of the coil L4 is connected to an application end of a ground voltage GND2. A cathode of the diode D3 is connected to an anode of a light emitting diode 2. A cathode of the light emitting diode 2 is connected to the application end of the ground voltage GND2. The capacitor C6 is connected across the light emitting diode 2. As the capacitor C6, a ceramic capacitor (for example, 0.1 µF) can be used. A first end of the coil L5 is connected to an anode of a diode D1. A second end of the coil L5 is connected to an application end of a ground voltage GND.

In the light emitting diode driving device 1 configured as above, when the transistor N1 is in an on state, a primary current (corresponding to a sense current Is) flows from the application end of the input voltage Vin toward an application end of the ground voltage GND via the coil L3, the transistor N1, and a resistor R4. On the other hand, when the transistor N1 is in an off state, induced electric power is generated in the coil L4, which, together with the coil L3, constitutes a transformer, and a secondary current (corresponding to an output current ILED) flows from the coil L4 toward the application end of the ground voltage GND2 via the diode D3 and the light emitting diode 2. The coil L5, on the other hand, which, together with the coil L3, constitutes a transformer, generates a charging current of the capacitor C2 by using the primary current flowing through the coil L3. By adopting this configuration, the ground voltage GND on a primary side and the ground voltage GND2 on a secondary side can be insulated from each other.

The light emitting diode driving device 1 of the third configuration example is favorably used for, for example, a medium-power (25 W to 100 W) LED lighting appliance (for indoor lighting, outdoor lighting, or the like).

Figure 4:
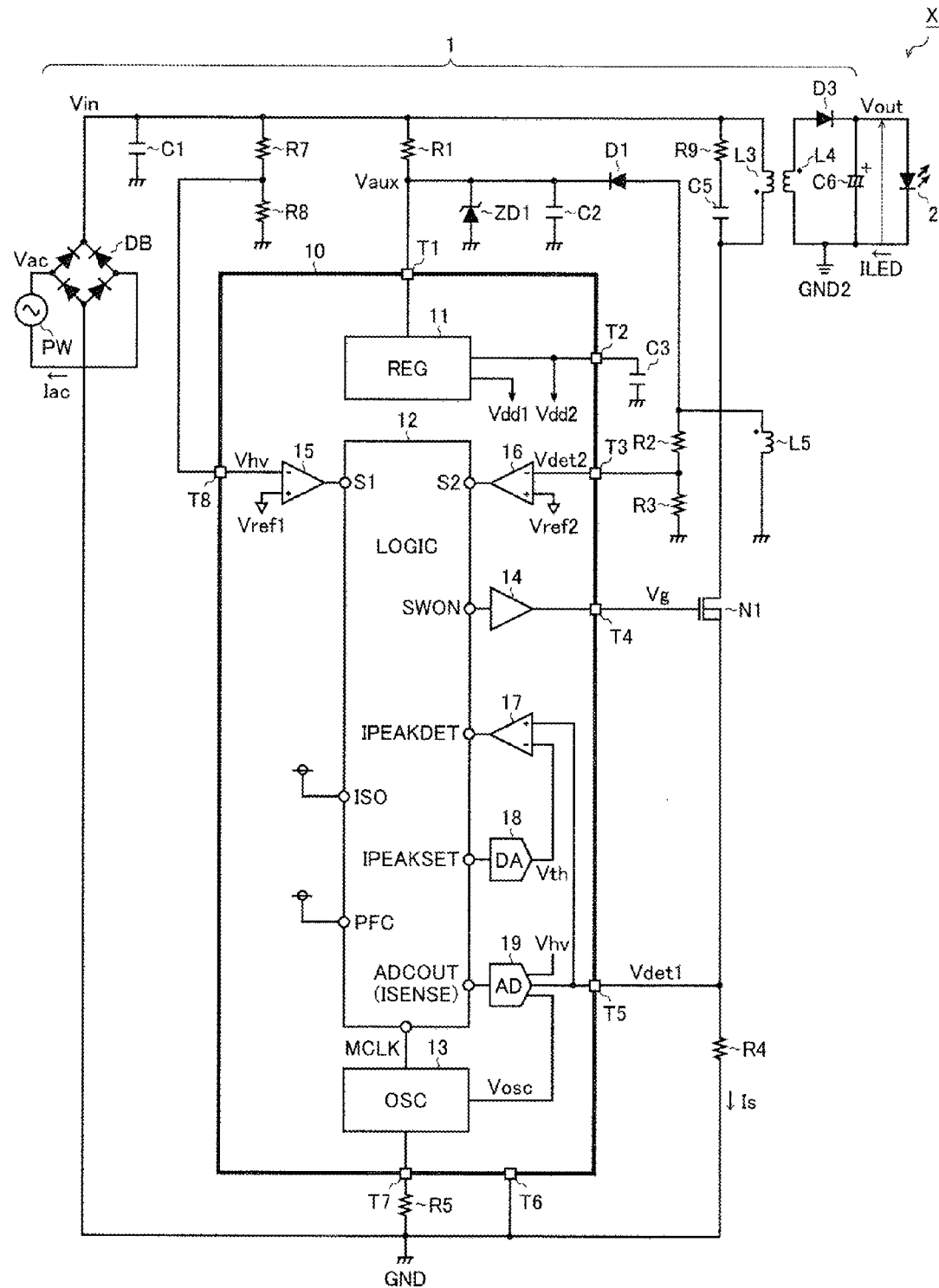
FIG. 4 is a diagram showing a fourth configuration example (insulated type; power factor correction control enabled) of the LED lighting appliance.

Next, with reference to FIG. 4, a description is given of the fourth configuration example. In the fourth configuration example, the discrete components (N1, DB, R1 to R5, R7 to R9, C1 to C3, C5, C6, D1, D3, ZD1, L3 to L5) externally connected to the semiconductor device 10 are mostly the same as those in the third configuration example. The fourth configuration example, however, has three differences from the third configuration example.

A first difference is that, as a capacitor C1 for smoothing an input voltage Vin, instead of an electrolytic capacitor, a ceramic capacitor (for example, 0.1 µF) is used. A second difference is that, as a capacitor C6 for smoothing an output voltage Vout, instead of a ceramic capacitor, an electrolytic capacitor (for example, 10 µF) is used. A third difference is that, in place of the resistor R6 for pulling up the external terminal T8 to the second power source voltage Vdd2, resistors R7 and R8 for dividing the input voltage Vin and applying a resulting voltage to the external terminal T8 are externally connected to the semiconductor device 10. A voltage division ratio between the resistors R7 and R8 could be adjusted as appropriate in consideration of an amplitude level of the input voltage Vin and input dynamic ranges of a comparator 15 and an AD converter 19.

The light emitting diode driving device 1 of the fourth configuration example is favorably used for, for example, a high-power (100 W or more) LED lighting appliance (for road lighting or the like).

Next, a description is given of the internal configuration of the semiconductor device 10 used in common in all of the first to fourth configuration examples. In the semiconductor device 10, a regulator 11, a logic portion 12, an oscillator 13, a driver 14, comparators 15 to 17, a DA (digital/analog) converter 18, and an AD (analog/digital) converter 19 are integrated.

The regulator 11 generates, from the external voltage Vaux applied to the external terminal T1, a first power source voltage Vdd1 (for example, 12 V) and the second power source voltage Vdd2 (for example, 3.3 V) and supplies these voltages to various portions of the semiconductor device 10. The second power source voltage Vdd2 is applied to the external terminal T2. Furthermore, the regulator 11 is provided with a temperature protection function and an undervoltage protection function.

The logic portion 12 is a logic circuit that performs centralized control of the operations of the semiconductor device 10. The logic portion 12 is provided with, in addition to a function of controlling switching of the transistor N1 and a function of controlling an average current of the output current ILED, various abnormality protection functions (such as an overvoltage protection function, an overcurrent protection function, an LED short circuit protection function, and an LED open protection function). An internal configuration and operations of the logic portion 12 are to be described in detail later.

The oscillator 13 generates a master clock signal MCLK (for example, 10 MHz) required for driving the logic portion 12. Furthermore, the oscillator 13 is also provided with a function of generating a frequency setting voltage Vosc for performing variable control of a switching frequency Fsw of the transistor N1 in accordance with a resistance value of the resistor R5 externally connected to the external terminal T7.

The driver 14 generates a gate voltage Vg in accordance with a switch control signal SWON inputted from the logic portion 12 and applies the gate voltage Vg to the gate of the transistor N1 through the external terminal T4, thereby performing on/off control of the transistor N1. The driver 14 is provided with a level shift function for generating the gate voltage Vg (H: Vdd1; L: GND) from the switch control signal SWON (H: Vdd2; L: GND) and a soft switching function for causing a voltage value of the gate voltage Vg to gradually change.

The comparator 15 compares an input monitoring voltage Vhv applied to an inverted input end (−) thereof through the external terminal T8 with a predetermined reference voltage Vref1 (<Vdd2) applied to a non-inverted input end (+) thereof, and based on a result of the comparison, generates an input monitoring signal S1, which it then transmits to the logic portion 12. The input monitoring signal S1 becomes low in level when the input monitoring voltage Vhv is higher than the reference voltage Vref1 and becomes high in level when the input monitoring voltage Vhv is lower than the reference voltage Vref1. The input monitoring signal S1 is used for phase angle detection or the like. In each of the first configuration example shown in FIG. 1 and the third configuration example shown in FIG. 3, however, since the external terminal T8 is pulled up to the application end of the second power source voltage Vdd2 via the resistor R6, the input monitoring signal S1 is always at a low level. The input monitoring voltage Vhv is inputted not only to the comparator 15 but also to the AD converter 19.

The comparator 16 compares an output monitoring voltage Vdet2 applied to an inverted input end (−) thereof through the external terminal T3 with a predetermined reference voltage Vref2 applied to a non-inverted input end (+) thereof, and based on a result of the comparison, generates an output monitoring signal S2, which it then transmits to the logic portion 12. The output monitoring signal S2 becomes low in level when the output monitoring voltage Vdet2 is higher than the reference voltage Vref2 and becomes high in level when the output monitoring voltage Vdet2 is lower than the reference voltage Vref2. The output monitoring signal S2 is used for zero-crossing detection, overvoltage detection, LED open detection, LED short circuit detection, and so on.

The comparator 17 compares a current detection voltage Vdet1 applied to a non-inverted input end (+) thereof through the external terminal T5 with a current peak setting voltage Vth applied from the DA converter 18 to an inverted input end (−) thereof, and based on a result of the comparison, generates a current peak detection signal IPEAKDET, which it then transmits to the logic portion 12. The current detection voltage Vdet1 is generated by the resistor R4 performing current/voltage conversion of the sense current Is flowing through the transistor N1. Accordingly, a voltage value (=Is×R4) of the current detection voltage Vdet1 changes in accordance with a current value of the sense current Is. The current peak detection signal IPEAKDET becomes high in level when the current detection voltage Vdet1 is higher than the current peak setting voltage Vth and becomes low in level when the current detection voltage Vdet1 is lower than the current peak setting voltage Vth. The current peak detection signal IPEAKDET is used for, for example, detection of an off timing of the transistor N1.

The DA converter 18 converts a current peak setting signal IPEAKSET in digital form inputted from the logic portion 12 into the current peak setting voltage Vth in analog form and outputs the current peak setting voltage Vth to the non-inverted input end (+) of the comparator 17.

The AD converter 19 converts the current detection voltage Vdet1 in analog form inputted through the external terminal T5 into a current detection signal ISENSE in digital form and outputs the current detection signal ISENSE to the logic portion 12. Furthermore, to the AD converter 19, not only the current detection voltage Vdet1 but also the input monitoring voltage Vhv, the frequency setting voltage Vosc, and so on are inputted in parallel, and the AD converter 19 sequentially performs AD conversion of inputted signals of a plurality of systems at respective timings allotted thereto by timing sharing.

In the semiconductor device 10 configured as above, the logic portion 12 is equipped with an ISO pad for performing setting as to whether the light emitting diode driving device 1 is of the insulated type or of the non-insulated type and a PFC pad for performing setting as to whether power factor correction control is enabled or disabled, and calculates a signal value of the current peak setting signal IPEAKSET by using a computation equation corresponding to respective applied voltages (one form of a computation mode setting signal) to these pads.

To be more specific, when an applied voltage to the ISO pad is at a low level, a computation equation adapted to a non-insulated type (buck type) light emitting diode driving device 1 is used to calculate a signal value of the current peak setting signal IPEAKSET. On the other hand, when an applied voltage to the ISO pad is at a high level, a computation equation adapted to an insulated type (fly-back type) light emitting diode driving device 1 is used to calculate a signal value of the current peak setting signal IPEAKSET.

Furthermore, when an applied voltage to the PFC pad is at a low level, a computation equation adapted to a light emitting diode driving device 1 in which power factor correction control is disabled is used to calculate a signal value of the current peak setting signal IPEAKSET. On the other hand, when an applied voltage to the PFC pad is at a high level, a computation equation adapted to a light emitting diode driving device 1 in which power factor correction control is enabled is used to calculate a signal value of the current peak setting signal IPEAKSET.

Based on the above, in the first configuration example (non-insulated type (buck type); power factor correction control disabled), an applied voltage to the ISO pad and an applied voltage to the PFC pad are both set to a low level. Furthermore, in the second configuration example (non-insulated type (buck type); power factor correction control enabled), an applied voltage to the ISO pad is set to a low level, and an applied voltage to the PFC pad is set to a high level. Furthermore, in the third configuration example (insulated type (fly-back type); power factor correction control disabled), an applied voltage to the ISO pad is set to a high level, and an applied voltage to the PFC pad is set to a low level. Furthermore, in the fourth configuration example (insulated type (fly-back type); power factor correction control enabled), an applied voltage to the ISO pad and an applied voltage to the PFC pad are both set to a high level.

<Average Current Control>

FIGS. 5 to 8 are diagrams for explaining average current control in the first to fourth configuration examples, respectively. On the left side in each of the figures, behaviors of the alternating current voltage Vac, an alternating current Iac, and the output current ILED are depicted, respectively. On the right side in each of the figures, a behavior of the current detection voltage Vdet1 during a switching cycle T of the transistor N1 is depicted. In each of the figures, a hatched region on the right side shows the amount of energy consumed as the output current ILED of the light emitting diode 2. Furthermore, unless otherwise specified, the following description assumes the use of a continuous current mode (CCM) in which the output current ILED will in no case decrease to a zero value in an off period of the transistor N1.

In each of the first to fourth configuration examples, the transistor N1 is switched on at every predetermined switching cycle T (=1/Fsw) determined based on the frequency setting voltage Vosc. In an on period Ton of the transistor N1, the current detection voltage Vdet1 rises as the sense current Is increases. At a point in time when the current detection voltage Vdet1 exceeds the current peak setting voltage Vth, the transistor N1 is switched off. A voltage value of the current peak setting voltage Vth is determined in accordance with the current peak setting signal IPEAKSET generated by the logic portion 12.

Herein, the logic portion 12, which, upon receiving an input of the current detection signal ISENSE, generates the current peak setting signal IPEAKSET, includes a computation circuit 122 (see FIG. 15; a detail thereof is to be described later) that calculates a signal value Y1 of the current peak setting signal IPEAKSET by using a computation equation expressed by Equation (1) below, where a signal value of the current peak setting signal IPEAKSET (corresponding to a voltage value of the current peak setting voltage Vth) is denoted as Y1, an average current set value of the output current ILED as AVE, an adjustment coefficient for the average current set value AVE as α, an on period of the transistor N1 as Ton, and a change rate of the current detection signal ISENSE (and therefore the current detection voltage Vdet1) in the on period Ton of the transistor N1 as Δ.

$$Y1 = AVE \times \alpha + \Delta \times Ton/2 \quad (1)$$

The above-described change rate Δ can be calculated by using a computation equation expressed by Equation (2) below, where, in the on period Ton of the transistor N1, a signal value of the current detection signal ISENSE (corresponding to a voltage value of the current detection voltage Vdet1) detected at a time t0 is denoted as y0, and a signal value of the current detection signal ISENSE detected at a time t1 as y1.

$$\Delta = (y1-y0)/(t1-t0) \quad (2)$$

It can be said that a computation using Equation (1) above is equivalent to an operation in which, in the on period Ton of the transistor N1, while a mean signal value of the current detection signal ISENSE is made to coincide with AVE×α, based on the change rate Δ of the current detection signal ISENSE, an extrapolation value (peak value) of the current detection signal ISENSE at an end point in time of the on period Ton is calculated, which then is set as the signal value Y1 of the current peak setting signal IPEAKSET.

Herein, the computation circuit 122 determines the adjustment coefficient α by which the average current set value AVE is multiplied in accordance with the computation mode setting signals (for example, respective applied voltages to the ISO pad and the PFC pad) inputted to the logic portion 12, thereby calculating the signal value Y1 of the current peak setting signal IPEAKSET by using computation equations adapted to the first to fourth configuration examples, respectively. In the following, with sequential reference to FIGS. 5 to 8, a specific description is given individually for each of the first to fourth configuration examples.

Figure 5:
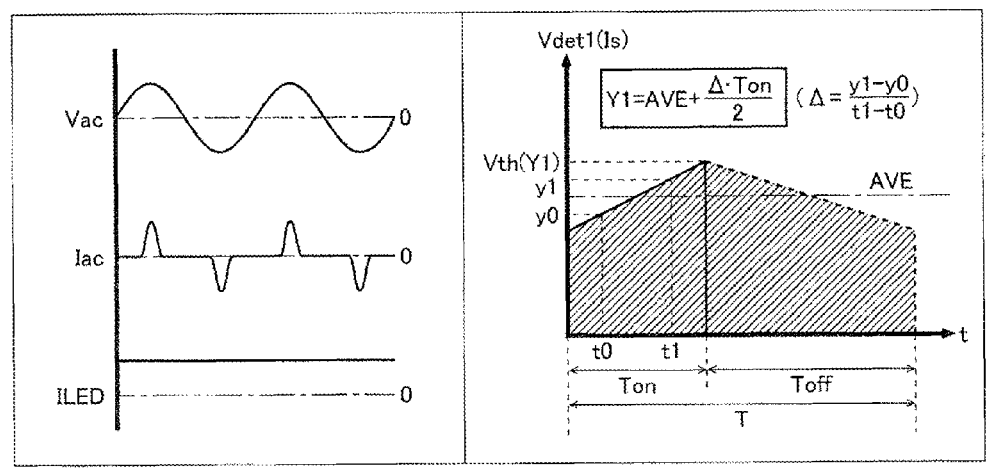
FIG. 5 is a diagram for explaining average current control in the first configuration example.

In the average current control in the first configuration example (non-insulated type (buck type); power factor correction control disabled) shown in FIG. 5, the logic portion 12 calculates the signal value Y1 of the current peak setting signal IPEAKSET by using a computation equation expressed by Equation (1a) below.

$$Y1 = AVE + \Delta \times Ton/2 \quad (1a)$$

That is, in the first configuration example, by using 1 as the adjustment coefficient α for the average current set value AVE, the average current set value AVE is multiplied by 1. In the first configuration example, Equation (1a) above is used, and thus, in the light emitting diode driving device 1 of the non-insulated type, the output current ILED can be maintained at a constant value corresponding to the average current set value AVE. In the first configuration example, however, power factor correction control is disabled, and the alternating current voltage Vac and the alternating current Iac do not necessarily change in phase with each other, which results in a decrease in power factor of the light emitting diode driving device 1.

Figure 6:
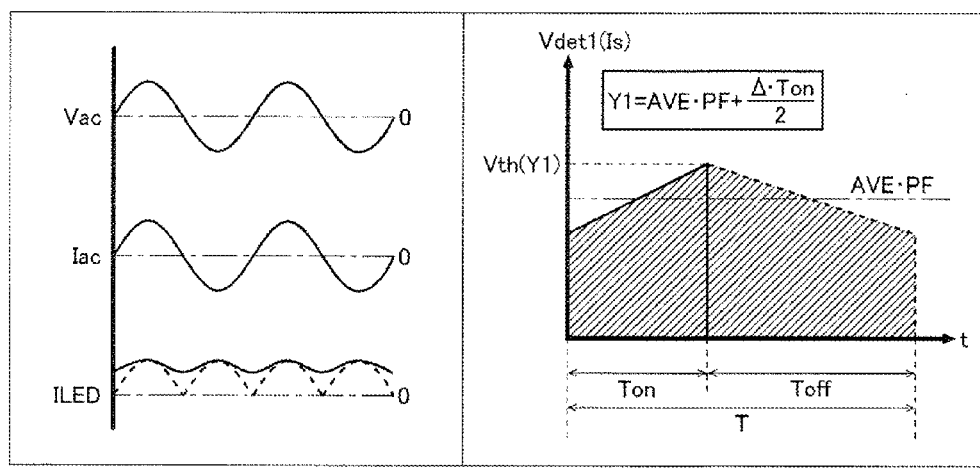
FIG. 6 is a diagram for explaining average current control in the second configuration example.

In the average current control in the second configuration example (non-insulated type (buck type); power factor correction control enabled) shown in FIG. 6, the logic portion 12 calculates the signal value Y1 of the current peak setting signal IPEAKSET by using a computation equation expressed by Equation (1b) below.

$$Y1 = AVE \times PF + \Delta \times Ton/2 \quad (1b)$$

That is, in the second configuration example, by using a power factor correction coefficient PF as the adjustment coefficient α for the average current set value AVE, the average current set value AVE is multiplied by the power factor correction coefficient PF. The power factor correction coefficient PF is a variable value that changes following the same behavior as that of the input voltage Vin (and therefore the alternating current voltage Vac). In the second configuration example, Equation (1b) above is used, and thus, at every switching cycle T of the transistor N1, an average current value of the output current ILED changes with a change in the input voltage Vin. Consequently, the alternating current voltage Vac and the alternating current Iac can be made to change in phase with each other, and thus it becomes possible for the light emitting diode driving device 1 of the non-insulated type to have an improved power factor. The above-described power factor correction control, however, causes a ripple component with an oscillation frequency (100 Hz/120 Hz) twice an alternating current frequency to be generated in the output current ILED. For this reason, in a case where power factor correction control is enabled, preferably, an electrolytic capacitor (the capacitor C4 in FIG. 2) for smoothing the output voltage Vout is provided.

In the average current control in the third configuration example (insulated type (fly-back type); power factor correction control disabled) shown in FIG. 7, the logic portion 12 calculates the signal value Y1 of the current peak setting signal IPEAKSET by using a computation equation expressed by Equation (1c) below.

$$Y1 = AVE \times \{T/(T-Ton)\} + \Delta \times Ton/2 \quad (1c)$$

Figure 7:
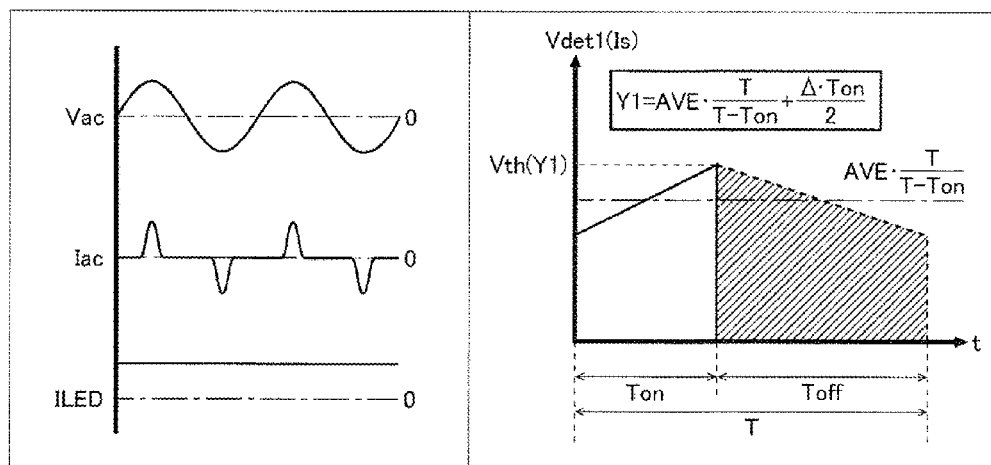
FIG. 7 is a diagram for explaining average current control in the third configuration example.

In a case where the light emitting diode driving device 1 is of the insulated type (fly-back type), only in an off period Toff (=T−Ton) of the transistor N1, the output current ILED flows (see the hatched region in FIG. 7). In view of this fact, in the third configuration example, by using a ratio {T/(T−Ton)} between the switching cycle T and the off period Toff (=T−Ton) as the adjustment coefficient α for the average current set value AVE, the average current set value AVE is multiplied by the ratio {T/(T−Ton)}. In the third configuration example, Equation (1c) above is used, and thus, in the light emitting diode driving device 1 of the insulated type, the output current ILED can be maintained at a constant value corresponding to the average current set value AVE. In the third configuration example, however, similarly to the first configuration example, power factor correction control is disabled, and the alternating current voltage Vac and the alternating current Iac do not necessarily change in phase with each other, which results in a decrease in power factor of the light emitting diode driving device 1.

Figure 8:
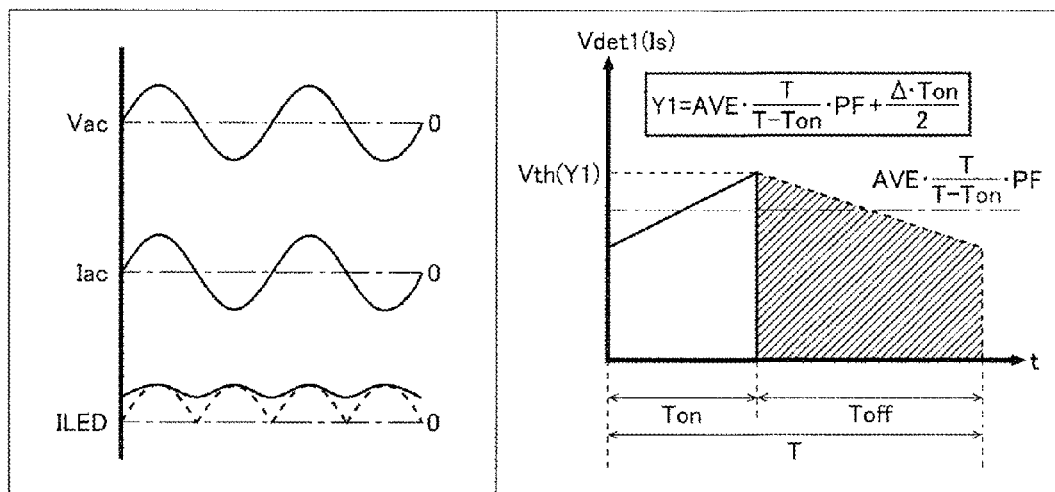
FIG. 8 is a diagram for explaining average current control in the fourth configuration example.

In the average current control in the fourth configuration example (insulated type (fly-back type); power factor correction control enabled) shown in FIG. 8, the logic portion 12 calculates the signal value Y1 of the current peak setting signal IPEAKSET by using a computation equation expressed by Equation (1d) below.

$$Y1=AVE\times\{T/(T-Ton)\}\times PF+\Delta\times Ton/2 \quad (1d)$$

In the fourth configuration example, by using {T/(T−Ton)}×PF as the adjustment coefficient α for the average current set value AVE, the average current set value AVE is multiplied by {T/(T−Ton)}×PF. In the fourth configuration example, Equation (1d) above is used, and thus it becomes possible for the light emitting diode driving device 1 of the insulated type to have an improved power factor. In the fourth configuration example, however, similarly to the second configuration example, a ripple component is generated in the output current ILED, and therefore, preferably, an electrolytic capacitor (the capacitor C6 in FIG. 4) for smoothing the output voltage Vout is provided.

As can be understood by comparing the first and second configuration examples (non-insulated type) with the third and fourth configuration examples (insulated type), the computation circuit 122 determines whether or not the ratio {T/(T−Ton)} between the switching cycle T and the off period Toff (=T−Ton) should be included in the adjustment coefficient α in accordance with whether the insulated type or the non-insulated type is used.

Furthermore, as can be understood by comparing the first and third configuration examples (power factor correction control disabled) with the second and fourth configuration examples (power factor correction control enabled), the computation circuit 122 determines whether or not the power factor correction coefficient PF should be included in the adjustment coefficient α in accordance with whether power factor control is enabled or disabled.

That is, when the logic portion 12 is designed as a circuit adaptable to the fourth configuration example (insulated type; power factor correction control enabled), and the adjustment coefficient α by which the average current set value AVE is multiplied is determined in accordance with the computation mode setting signals (for example, respective applied voltages to the ISO pad and the PFC pad) inputted to the logic portion 12, it becomes possible to cope with all of the first to fourth configuration examples.

Figure 9:
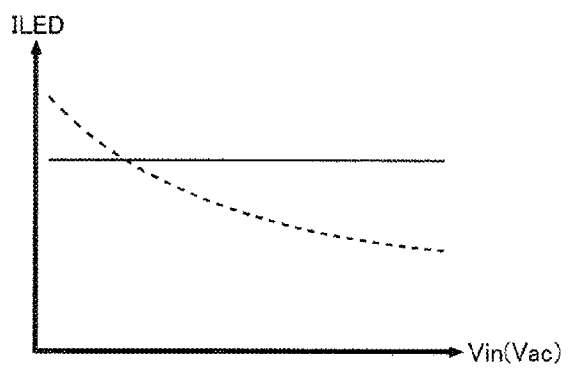
FIG. 9 is a diagram showing an input voltage characteristic of an output current ILED.

FIG. 9 is a diagram showing an input voltage characteristic of the output current ILED (solid line: average current control method according to the present invention; broken line: conventional peak current control method). As shown in FIG. 9, with the average current control method according to the present invention, compared with the conventional peak current control method, the input voltage characteristic of the output current ILED can be improved. It thus becomes possible to maintain the output current ILED at a constant value even when the input voltage Vin varies, thus making it possible to suppress luminance fluctuations and flickering of the light emitting diode 2.

Figure 10:
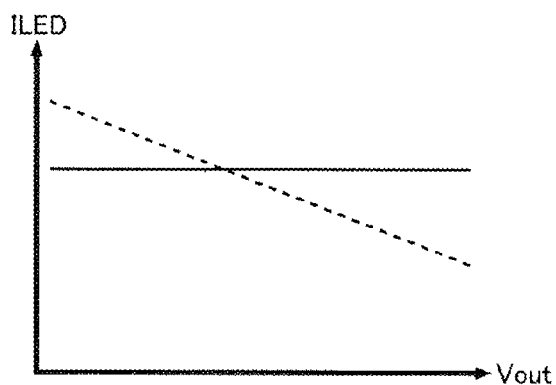
FIG. 10 is a diagram showing an output voltage characteristic of the output current ILED.
Figure 11:
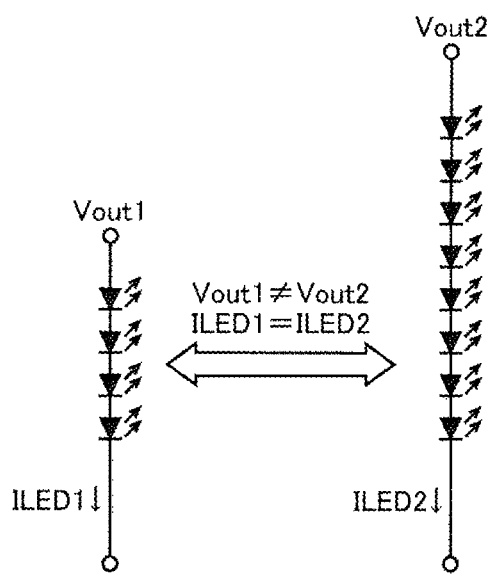
FIG. 11 is a diagram showing a relationship between the number of LED stages and the output current ILED.

FIG. 10 is a diagram showing an output voltage characteristic of the output current ILED (solid line: average current control method according to the present invention; broken line: conventional peak current control method). As shown in FIG. 10, with the average current control method according to the present invention, compared with the conventional peak current control method, the output voltage characteristic of the output current ILED can be improved. Thus, even in a case where, as shown in FIG. 11, the number of series stages of the light emitting diode 2 varies, the output current ILED can be maintained at a constant value, and thus application designing of the LED lighting appliance X is facilitated.

Figure 12:
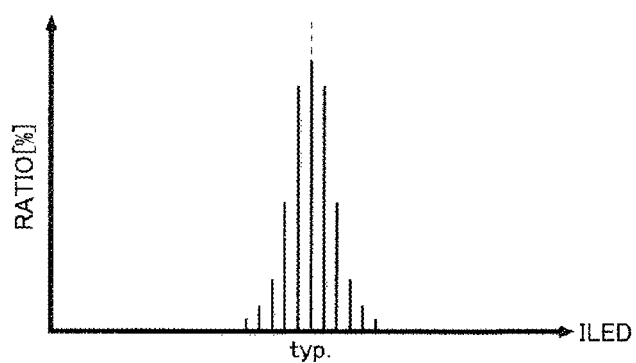
FIG. 12 is a histogram showing manufacturing variations in the output current ILED.

FIG. 12 is a histogram showing manufacturing variations in the output current ILED. With a configuration in which average current control of the output current ILED is performed through digital signal processing using the logic portion 12, it becomes possible to suppress manufacturing variations in the output current ILED to a small amount.

Furthermore, with the average current control method according to the present invention, unlike the conventional peak current control method, it also becomes possible to maintain the output current ILED at a constant value without depending on an inductance value of the coil L1.

Moreover, with the average current control method according to the present invention, unlike the conventional feedback control method, the discrete components externally connected to the semiconductor device 10 can be reduced to such an extent that only the resistor R4 (for example, 1.5 Ω) is used as such a discrete component, and thus it becomes possible to achieve a reduction in circuitry scale. Particularly, even in a case of an LED lighting appliance X of the insulated type, signal transmission from a secondary side to a primary side is not required, so that it becomes no longer necessary to use a photocoupler whose lifespan is short. This makes it possible to achieve an improvement in ease of maintenance and a cost reduction of the LED lighting appliance X.

<Power Factor Correction (PFC) Control>

Figure 13:
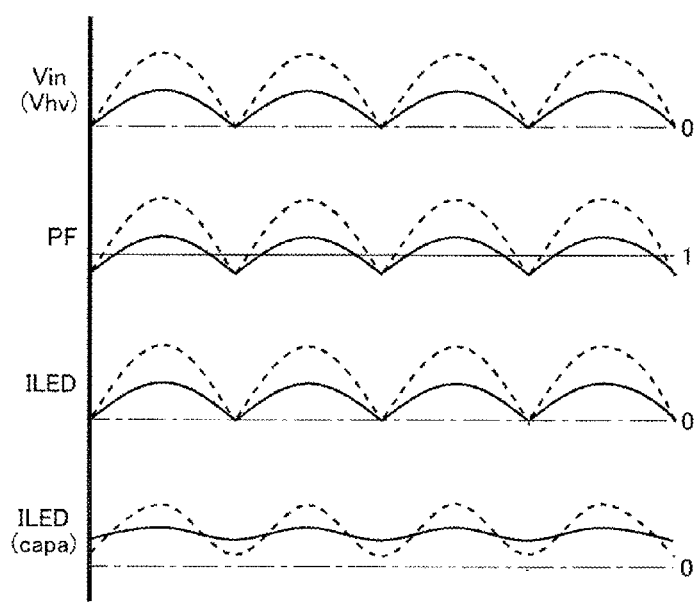
FIG. 13 is a diagram for explaining power factor correction control.

FIG. 13 is a diagram for explaining power factor correction control, in which, in order from the top, the input voltage Vin (input monitoring voltage Vhv), the power factor correction coefficient PF, and the output current ILED (non-smoothed/smoothed) are depicted.

In the light emitting diode driving device 1, power factor correction control by the logic portion 12 is enabled so that the output current ILED is made to change in phase with the input voltage Vin, and thus a power factor of the light emitting diode driving device 1 can be improved. It is not sufficient, however, to simply make the power factor correction coefficient PF change with a variation in the input voltage Vin, since in such a case, as shown by broken lines in FIG. 13, when the input voltage Vin varies, the output current ILED also varies, so that there occurs an increase in ripple component.

Hence, preferably, variable control of the power factor correction coefficient PF is performed so that, without depending on a variation in the input voltage Vin, the power factor correction coefficient PF always has a mean value of 1. With such a configuration, as shown by solid lines in FIG. 13, it becomes possible to maintain the output current ILED at a constant value even when the input voltage Vin varies.

The above-described power factor correction coefficient PF can be calculated by using a computation equation expressed by Equation (3) below.

$$PF=(AVE^2-Vin^2)/Vin^2\_ave \qquad (3)$$

Figure 14:
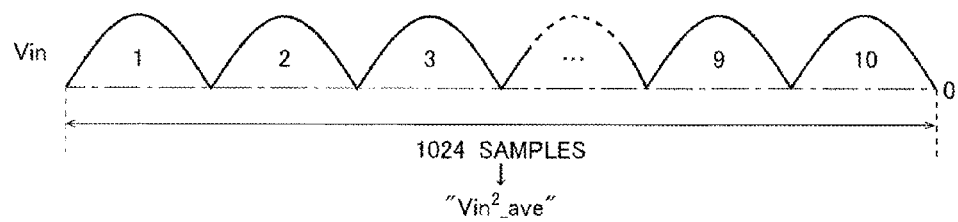
FIG. 14 is a diagram for explaining an operation of calculating $Vin^2\_ave$.

In Equation (3) above, $Vin^2\_ave$ is a square mean value of the input voltage Vin and is calculated, preferably, based on the input voltage Vin (in practice, a digital value obtained by performing AD conversion of the input monitoring voltage Vhv), which, as shown in FIG. 14, is sampled a plurality of times (for example, 1024 times) in a predetermined sampling period (of, for example, 10 pulses of the input voltage Vin).

<Logic Portion>

Figure 15:
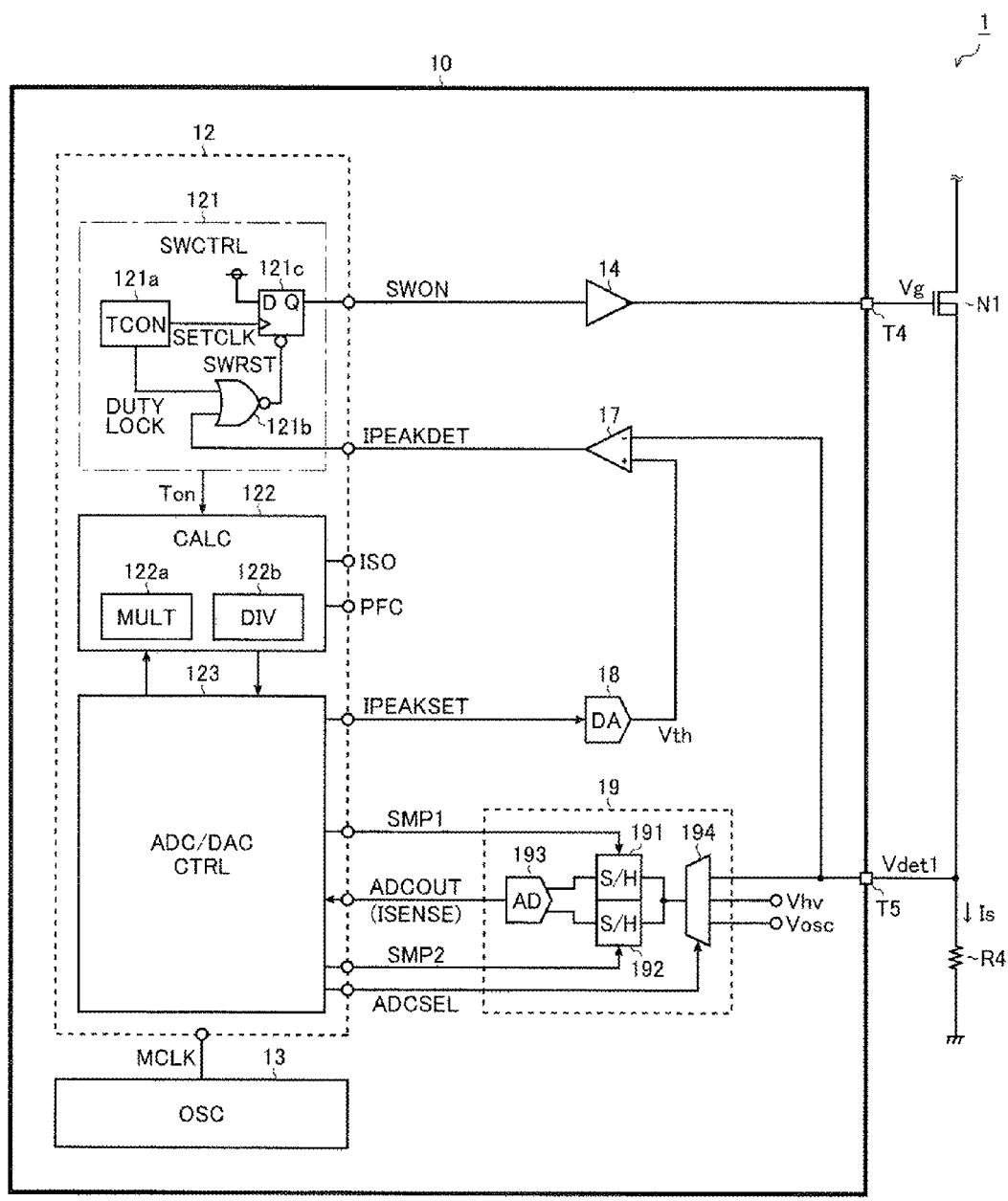
FIG. 15 is a block diagram showing one configuration example of a logic portion 12 and an AD converter 19.

FIG. 15 is a block diagram showing one configuration example of the logic portion 12 and the AD converter 19. The logic portion 12 includes a switch control circuit 121, the computation circuit 122, and an ADC/DAC control circuit 123. On the other hand, the AD converter 19 includes sample/hold circuits 191 and 192, an AD conversion circuit 193, and an input selection circuit 194.

The switch control circuit 121 is a circuit block that, upon receiving the current peak detection signal IPEAKDET, outputs the switch control signal SWON and includes a timing controller 121a, a NOR gate 121b, and a D flip-flop 121c.

In synchronization with the master clock signal MCLK, the timing controller 121a generates a set clock signal SETCLK and a duty lock signal DUTYLOCK.

The NOR gate 121b performs an NOR operation on the current peak detection signal IPEAKDET and the duty lock signal DUTYLOCK, thereby generating a switch reset signal SWRST. Accordingly, the switch reset signal SWRST becomes low in level when at least one of the current peak detection signal IPEAKDET and the duty lock signal DUTYLOCK is at a high level and becomes high in level when both of the current peak detection signal IPEAKDET and the duty lock signal DUTYLOCK are at a low level.

By using a rising edge of the set clock signal SETCLK as a trigger, the D flip-flop 121c sets the switch control signal SWON to a high level, and by using a falling edge of the switch reset signal SWRST, it resets the switch control signal SWON to a low level. The D flop-flop 121c is of a first-to-set type and therefore, in a high level period of the set clock signal SETCLK, does not perform the operation of resetting the switch control signal SWON based on the switch reset signal SWRST.

The computation circuit 122 includes one multiplier 122a and one divider 122b and, at every switching cycle T of the transistor N1, calculates the signal value Y1 of the current peak setting signal IPEAKSET, with the multiplier 122a and the divider 122b operated at respective timings allotted thereto by timing sharing. To the computation circuit 122, as information required for calculation processing to calculate the signal value Y1, in addition to the current detection signal ISENSE, information related to the switching cycle T and the on period Ton has been inputted.

The ADC/DAC control circuit 123 performs input and output of digital signals between itself and the AD converter 19 and between itself and the DA converter 18. For example, the ADC/DAC control circuit 123 outputs the current detection signal ISENSE inputted from the AD converter 19 to the computation circuit 122, while outputting the current peak setting signal IPEAKSET inputted from the computation circuit 122 to the DA converter 18. Furthermore, the ADC/DAC control circuit 123 outputs to the AD converter 19 various operation control signals (sampling control signals SMP1 and SMP2 and an input selection signal ADCSEL).

The sample/hold circuits 191 and 192 sample/hold, in accordance with the sampling control signals SMP1 and SMP2, respectively, voltage signals (Vdet1, Vhv, Vosc, etc.) selected by the input selection circuit 194 at different timings from each other.

The AD conversion circuit 193 sequentially performs AD conversion of respective output values of the sample/hold circuits 191 and 192 and outputs resulting values to the logic portion 12.

In accordance with the input selection signal ADCSEL, the input selection circuit 194 selects one of voltage signals (Vdet1, Vhv, Vosc, etc.) of a plurality of systems and outputs it.

Figure 16:
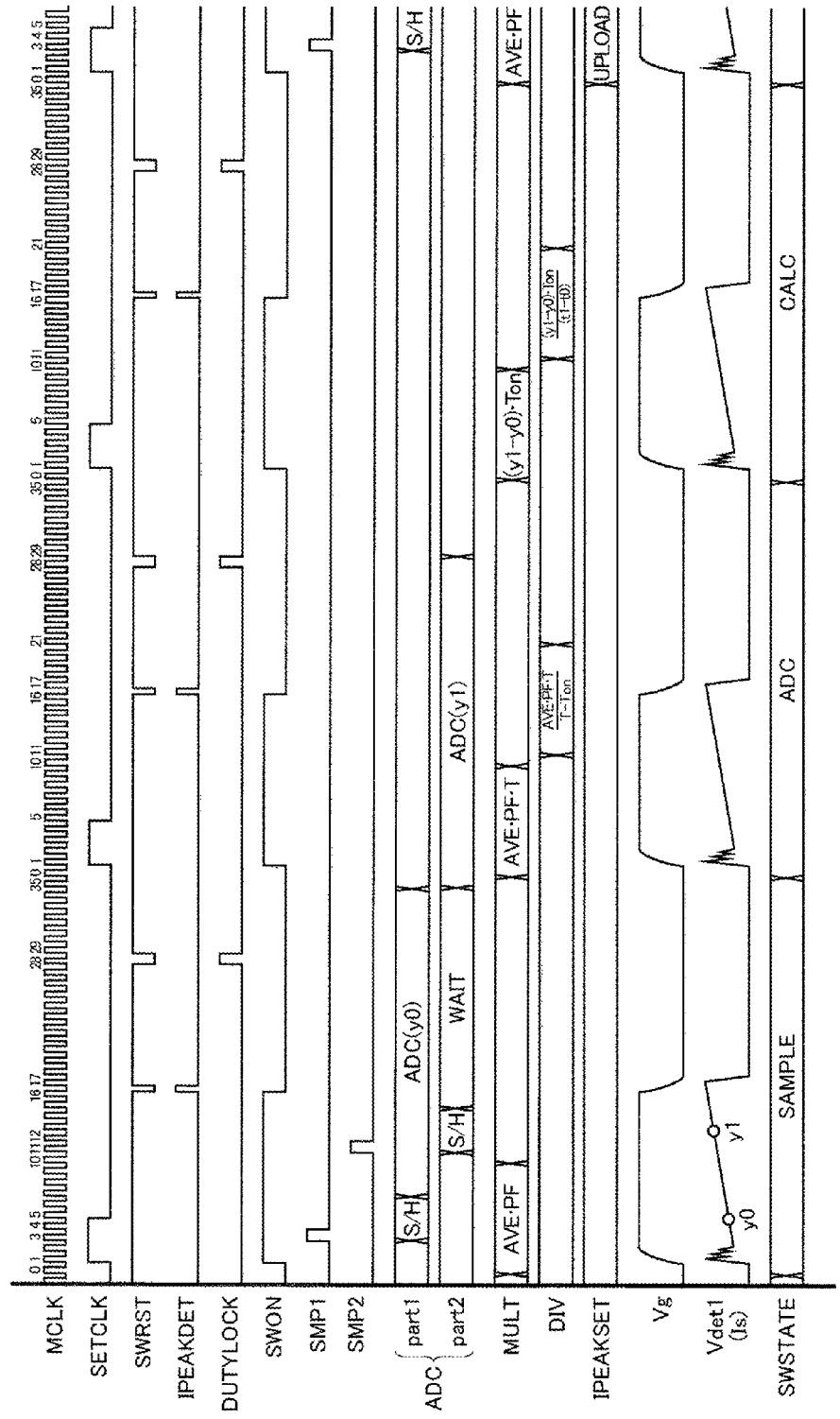
FIG. 16 is a timing chart for explaining average current control.

FIG. 16 is a timing chart for explaining average current control by the logic portion 12, in which, in order from the top, the master clock signal MCLK, the set clock signal SETCLK, the switch reset signal SWRST, the current peak detection signal IPEAKDET, the duty lock signal DUTY-LOCK, the switch control signal SWON, the sampling control signals SMP1 and SMP2, an operation status of the AD converter 19, an operation status of the multiplier 122a, an operation status of the divider 122b, the current peak setting signal IPEAKSET, the gate voltage Vg, the current detection voltage Vdet1 (corresponding to the sense current IS), and an operation state SWSTATE (SAMPLE/ADC/CALC) are depicted.

With reference to FIG. 16, a description is given by taking, as an example, a configuration in which the signal value Y1 of the current peak setting signal IPEAKSET is calculated by using the foregoing computation equation expressed by Equation (1d).

Upon the set clock signal SETCLK rising to a high level, the switch control signal SWON is set to a high level, and the gate voltage Vg becomes high in level. As a result, the transistor N1 is switched on, and the current detection voltage Vdet1 begins to rise. When the transistor N1 is switched on, switching noise is superimposed on the current detection voltage Vdet1. Hence, preferably, in order to avoid a situation where switching noise as described above is detected, the set clock signal SETCLK is maintained at a high level over a predetermined mask period (for example, 400 ns).

Upon the current detection voltage Vdet1 exceeding the current peak setting voltage Vth and the current peak detection signal IPEAKDET rising to a high level, the switch control signal SWON is reset to a low level, and the gate voltage Vg becomes low in level. As a result, the transistor N1 is switched off, and the current detection voltage Vdet1 decreases to a zero value.

The duty lock signal DUTYLOCK is set to rise to a high level at a timing corresponding to, for example, 75% of the switching cycle T. Accordingly, the on period Ton of the transistor N1 is restricted to 75% of the switching cycle T at the maximum.

In the on period Ton of the transistor N1, the sampling control signals SMP1 and SMP2 sequentially rise to a high level, and sample/hold processing to sample/hold the current detection voltage Vdet1 (processing to obtain y0 and y1) by the sample/hold circuits 191 and 192 is executed. Preferably, a timing for performing the sample/hold processing is set to, for example, a point in time corresponding to ¼ of the on period Ton and a point in time corresponding to ¾ of the on period Ton.

Furthermore, at every switching cycle T of the transistor N1, the computation circuit 122 generates (updates) the current peak setting signal IPEAKSET, with the multiplier 122a and the divider 122b operated at respective timings allotted thereto by timing sharing. For example, in an operation example shown in FIG. 16, at every switching cycle T, the three operation states SWSTATE (SAMPLE/ADC/CALC) occur in a looped sequence, and the current peak setting signal IPEAKSET is updated once every three times switching of the transistor N1 is performed.

To be specific, in a sample state (SAMPLE), by using the multiplier 122a, the average current set value AVE and the power factor correction coefficient PF are multiplied by each other.

Next, in an AD conversion state (ADC), by using the multiplier 122a, a result of the foregoing multiplication (=AVE×PF) and the switching cycle T are multiplied by each other, and then, by using the divider 122b, a result of the multiplication thus performed (=AVE×PF×T) is divided by the off period (T−Ton). At this point in time, the first term on the right side of Equation (1d) (=AVE×PF×{T/(T−Ton)}) is determined.

Next, in a computation state (CALC), by using the multiplier 122a, a value by which the current detection voltage Vdet1 has risen (y1−y0) and the on period Ton are multiplied by each other, and then, by using the divider 122b, a result of the multiplication thus performed (=(y1−y0)×Ton) is divided by a sampling interval (t1−t0) of the current detection voltage Vdet1. At this point in time, the second term on the right side of Equation (1d) (=Δ×Ton/2) is determined Computation processing to divide Δ×Ton by 2 can be sufficiently performed, without requiring the use of the divider 122b, by arithmetically shifting a bit string of a final output value (=Δ×Ton) of the divider 122b by one digit to the right.

Then, in a succeeding sample state (SAMPLE), together with the earlier described multiplication processing, upload processing (update processing) to upload the current peak setting signal IPEAKSET is performed. In a case where the current peak setting signal IPEAKSET is updated once every three times switching of the transistor N1 is performed, a settling time of the DA converter 18 should be set to be shorter than a grace period (for example, 500 ns) from a time when the current peak setting signal IPEAKSET is uploaded to a time when the set clock signal SETCLK rises to a high level.

With a configuration in which, as described above, the multiplier 122a and the divider 122b are operated at respective timings allotted thereto by timing sharing, it becomes possible to reduce a circuit scale of the computation circuit 122. The switching cycle T of the transistor N1 is sufficiently short compared with a pulse cycle of the input voltage Vin, and thus even in a case of adopting a configuration in which the current peak setting signal IPEAKSET is updated once every plurality of times (for example, three times) switching is performed, no hindrance is caused to average current control of the output current ILED.

Figure 17:
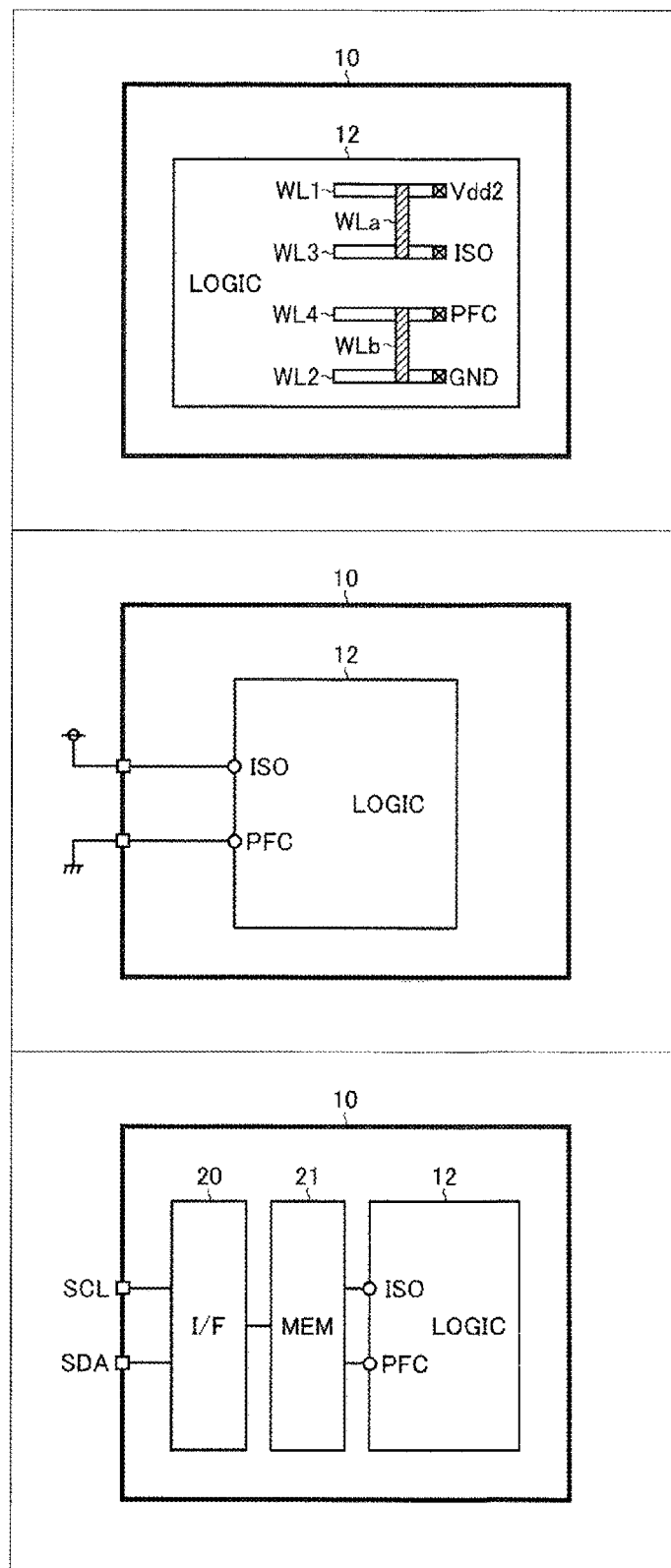
FIG. 17 is a diagram showing examples of terminal processing in the logic portion 12.

Next, a description is given of an input format for inputting the computation mode setting signals (terminal voltages of the ISO pad and the PFC pad) to the logic portion 12. FIG. 17 is a diagram showing examples of terminal processing in the logic portion 12.

As a first input format, a configuration is possible in which, as shown in FIGS. 1 to 4 described earlier, the computation mode setting signals are set within a package of the semiconductor device 10 through terminal processing in the logic portion 12. This configuration eliminates the need to uselessly increase the number of required external terminals of the semiconductor device 10.

In a case of adopting the first input format, the following configuration could be used. That is, as shown in an upper one of drawings in FIG. 17, the ISO pad and the PFC pad are arranged between a power source pad and a ground pad, and wiring layers WL1 to WL4 are formed in common to these pads so as to be connected thereto, respectively. Further, the wiring layer WL1 connected to the power source pad and the wiring layer WL3 connected to the ISO pad are connected to each other as appropriate via a wiring layer WLa, and the wiring layer WL2 connected to the ground pad and the wiring layer WL4 connected to the PFC pad are connected to each other as appropriate via a wiring layer WLb. This configuration allows the terminal processing in the logic portion 12 to be completed simply by modifying a wiring patterning process of the logic portion 12, thus eliminating the need to increase the number of required processes.

Furthermore, as a second input format, a configuration is possible in which, as shown in a middle one of the drawings in FIG. 17, external terminals for accepting external inputs of the computation mode setting signals are provided. This configuration makes it possible to arbitrarily input the computation mode setting signals even after the semiconductor device 10 has been packaged.

Furthermore, as a third input format, a configuration is possible in which, as shown in a lower one of the drawings in FIG. 17, as constituent components of the semiconductor device 10, an interface portion (such as an I²C interface portion) 20 that performs signal transmission and reception with the exterior and a memory portion (such as a register) 21 that stores the computation mode setting signals externally inputted via the interface portion 20 are additionally provided to accept the computation mode setting signals via the interface portion 20. Similarly to the second input format, this configuration makes it possible to arbitrarily input the computation mode setting signals even after the semiconductor device 10 has been packaged. It can be said that the third input format is suitable particularly in a case where the logic portion 12 is required to perform transmission and reception of not only the computation mode setting signal but also various other signals with the exterior.

<Dimming Mode>

Figure 18:
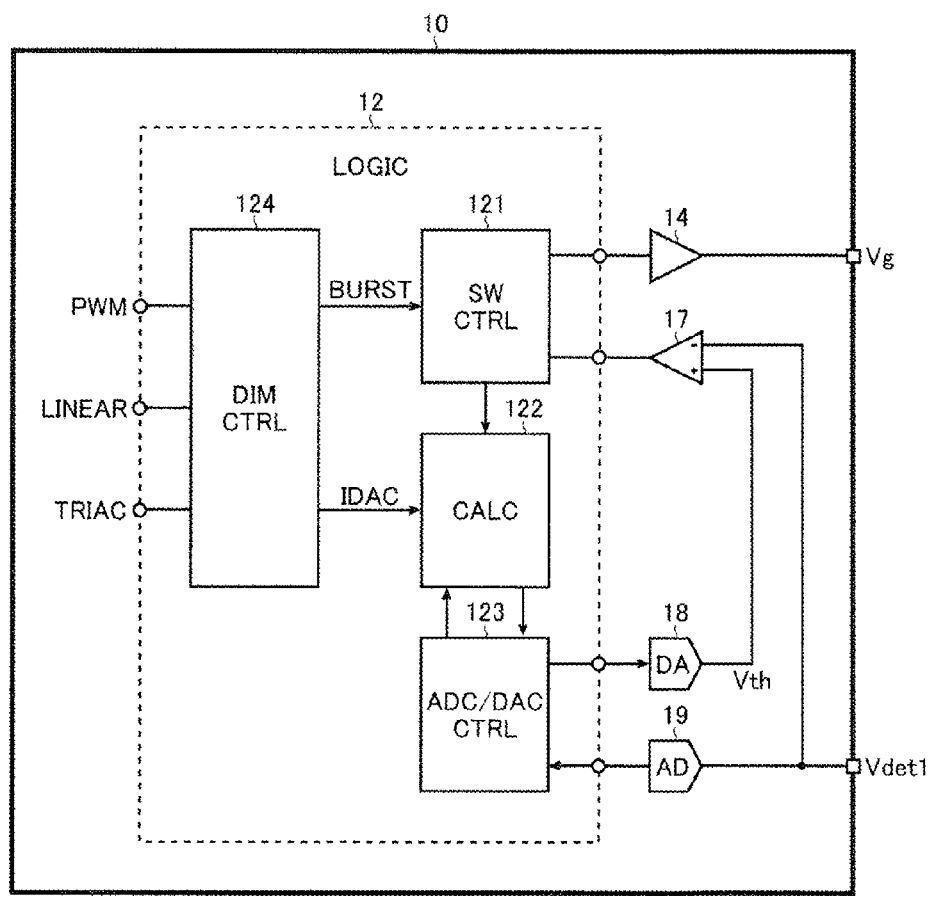
FIG. 18 is a block diagram showing one modified example of the logic portion 12.

FIG. 18 is a block diagram showing one modified example (a configuration additionally having a dimming function) of the logic portion 12. A logic portion 12 of this modified example includes a dimming control circuit 124 that accepts inputs of a PWM dimming signal, a linear dimming signal, and a phase dimming signal, and in accordance with any of these dimming signals, performs burst dimming or linear dimming of the light emitting diode 2.

In PWM diming, a duty of the PWM dimming signal is detected, and based on a result of the detection, a luminance of the light emitting diode 2 is set. In linear dimming, a signal value (analog voltage value) of the linear dimming signal is detected, and based on a result of the detection, a luminance of the light emitting diode 2 is set. In phase diming, a signal value (a phase angle of the input voltage Vin) of the phase dimming signal is detected, and based on a result of the detection, a luminance of the light emitting diode 2 is set.

Herein, the dimming control circuit 124 is additionally provided, and therefore, a computation circuit 122 is configured to determine whether or not a dimming coefficient IDAC should be included in the adjustment coefficient α for the average current set value AVE in accordance with whether diming control is enabled or disabled.

For example, a case is assumed in which, in each of the foregoing first to fourth configuration examples, the dimming control circuit 124 is additionally provided in the logic portion 12. In this case, when dimming control by the dimming control circuit 124 is disabled, the computation circuit 122 calculates the signal value Y1 of the current peak setting signal IPEAKSET by using the foregoing computation equations expressed by Equations (1a) to (1d), respectively. On the other hand, when the dimming control is enabled, the computation circuit 122 calculates the signal value Y1 of the current peak setting signal IPEAKSET by using computation equations expressed by Equations (1e) to (1h) below, respectively.

$$Y1=AVE \times IDAC+\Delta \times Ton/2 \quad (1e)$$

$$Y1=AVE \times PF \times IDAC+\Delta \times Ton/2 \quad (1f)$$

$$Y1=AVE \times \{T/(T-Ton)\} \times IDAC+\Delta \times Ton/2 \quad (1g)$$

$$Y1=AVE \times \{T/(T-Ton)\} \times PF \times IDAC+\Delta \times Ton/2 \quad (1h)$$

At the time of burst dimming, after setting the above-described dimming coefficient IDAC to 1, the diming control circuit 124 performs lighting-up and extinguishing control of the light emitting diode 2 at an on-duty corresponding to an inputted dimming signal. On the other hand, at the time of linear dimming, after setting the above-described dimming coefficient IDAC to a value corresponding to a dimming signal, the dimming control circuit 124 fully switches on the light emitting diode 2.

This configuration makes it possible to, while enjoying all the thus far described features of the average current control method, achieve diming control of the light emitting diode 2.

<Quasi-Resonant Mode>

Next, a description is given of a switching function between the continuous current mode (CCM) described in the foregoing and a quasi-resonant mode (QRM).

Figure 19:
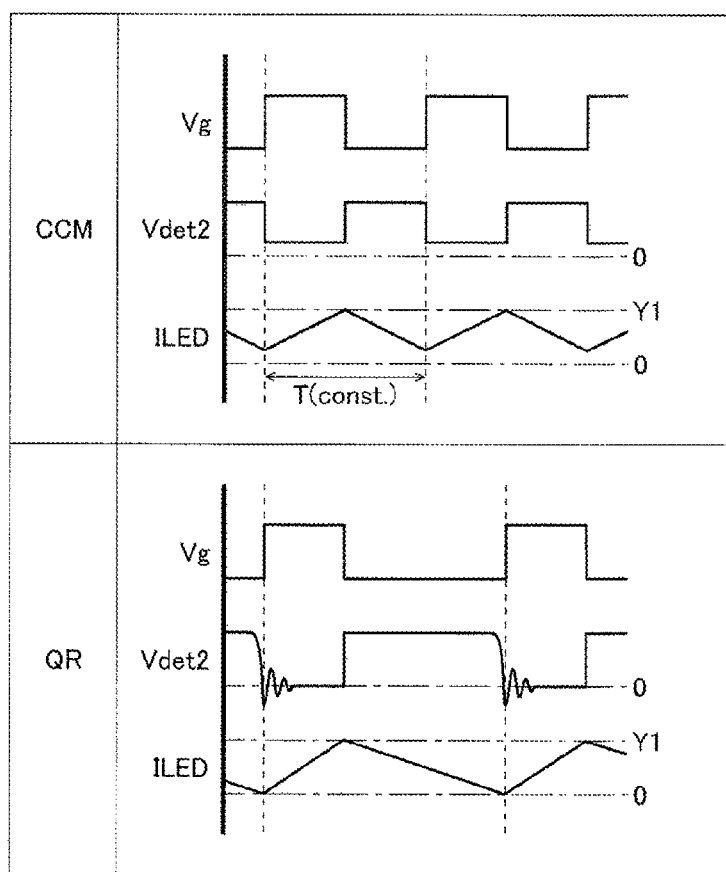
FIG. 19 is a diagram for explaining a difference between CCM and QRM.

FIG. 19 is a diagram for explaining a difference between the CCM (upper drawing) and the QRM (lower drawing), and in each of the upper and lower drawings, the gate voltage Vg, the output monitoring voltage Vdet2, and the output current ILED are depicted.

In the CCM, the transistor N1 is switched on at the predetermined switching cycles T, and the output current ILED will in no case decrease to a zero value in an off period of the transistor N1. In contrast to this, in the QRM, the switching cycle T of the transistor N1 is not fixed, and the transistor N1 is switched on at zero-crossing points of the output monitoring voltage Vdet2. That is, in the QRM, the transistor N1 is switched on at a time when energy stored in the coil L1 has all been consumed, so that energy loss is reduced compared with that in the CCM, in which sense the QRM is advantageous.

In order therefore to achieve a CCM/QRM switching function in the logic portion 12, the computation circuit 122 determines whether or not the second term on the right side of the foregoing computation equation expressed by Equation (1) (=$\Delta \times Ton/2$) should be validated in accordance with whether the CCM or the QRM is selected.

For example, a case is assumed in which, in each of the foregoing first to fourth configuration examples, the CCM/QRM switching function is added to the logic portion 12. In this case, when the CCM is selected, the computation circuit 122 calculates the signal value Y1 of the current peak setting signal IPEAKSET by using the foregoing computation equations expressed by Equations (1a) to (1d), respectively. On the other hand, when the QRM is selected, the computation circuit 122 calculates the signal value Y1 of the current peak setting signal IPEAKSET by using computation equations expressed by Equations (1w) to (1z) below, respectively.

$$Y1=2 \times AVE \quad (1w)$$

$$Y1=2 \times AVE \times PF \quad (1x)$$

$$Y1=2 \times AVE \times \{T/(T-Ton)\} \quad (1y)$$

$$Y1=2 \times AVE \times \{T/(T-Ton)\} \times PF \quad (1z)$$

This configuration makes it possible to perform, as required, output current control using the QRM. In a case where the foregoing dimming control function further is added, Equations (1w) to (1z) above could be rewritten to multiply the average current set value AVE further by the dimming coefficient IDAC.

Figure 20:
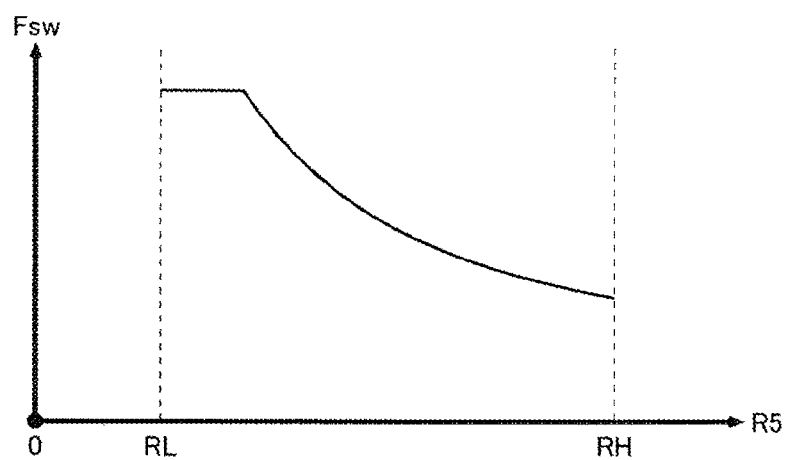
FIG. 20 is a diagram showing a relationship between a resistance value of a resistor R5 and a switching frequency Fsw.

By the way, as shown in FIG. 20, the switching frequency Fsw of the transistor N1 can be adjusted based on a resistance value of the resistor R5 connected to the external terminal T7. This switching frequency setting function, however, is a function required in a case of performing output current control using the CCM, and in a case of performing output current control using the QRM, the switching frequency Fsw is set to a zero value.

From this viewpoint, in a case where the CCM/QRM switching function is added to the logic portion 12, a configuration could be used in which the computation circuit 122 perceives whether the CCM or the QRM is selected in accordance with whether or not the switching frequency Fsw of the transistor N1 is set to a zero value. The switching frequency Fsw of the transistor N1 could be set to a zero value by, for example, short-circuiting the external terminal T7 to the application end of the ground voltage GND such that the resistor R5 has a resistance value outside a range of resistance values (RL to RH) set for the resistor R5. This configuration allows the external terminal T7 to function not only as a frequency setting terminal but also as a CCM/QRM switching terminal, thus eliminating the need to uselessly increase the number of required external terminals.

<Specific Application Examples of LED Lighting Appliance>

Figure 21A:
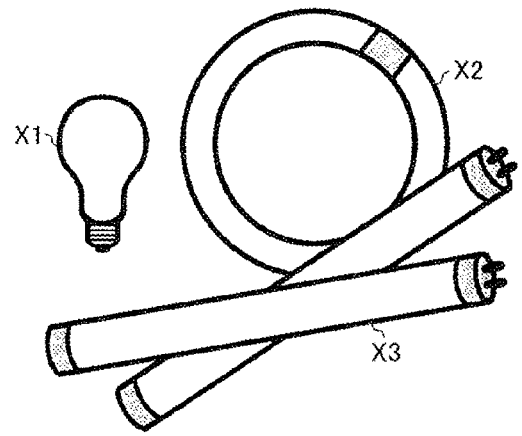
FIG. 21A is an outer appearance view showing a first application example (LED lamp) of the LED lighting appliance.
Figure 21B:
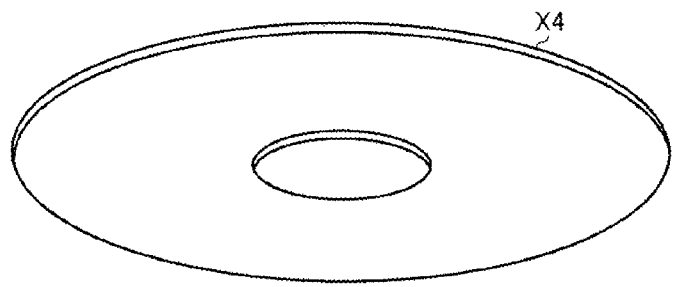
FIG. 21B is an outer appearance view showing a second application example (LED ceiling light) of the LED lighting appliance.
Figure 21C:
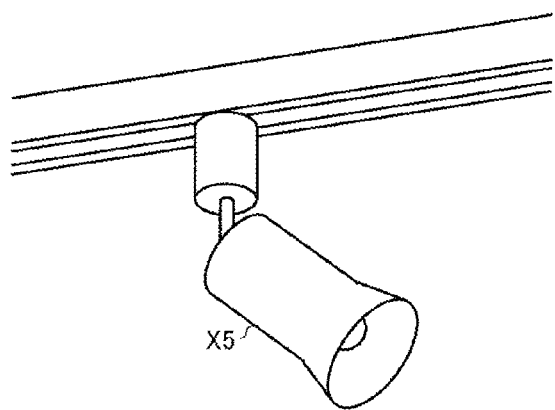
FIG. 21C is an outer appearance view showing a third application example (LED downlight) of the LED lighting appliance.
Figure 22:
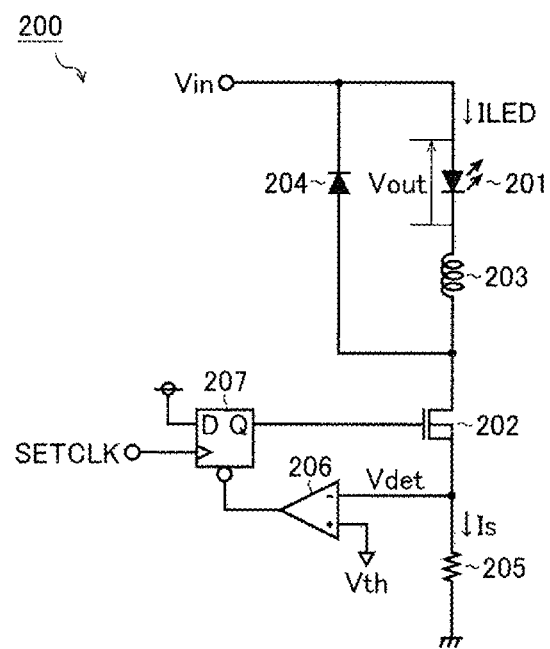
FIG. 22 is a diagram showing a first conventional example of an LED lighting appliance.
Figure 23:
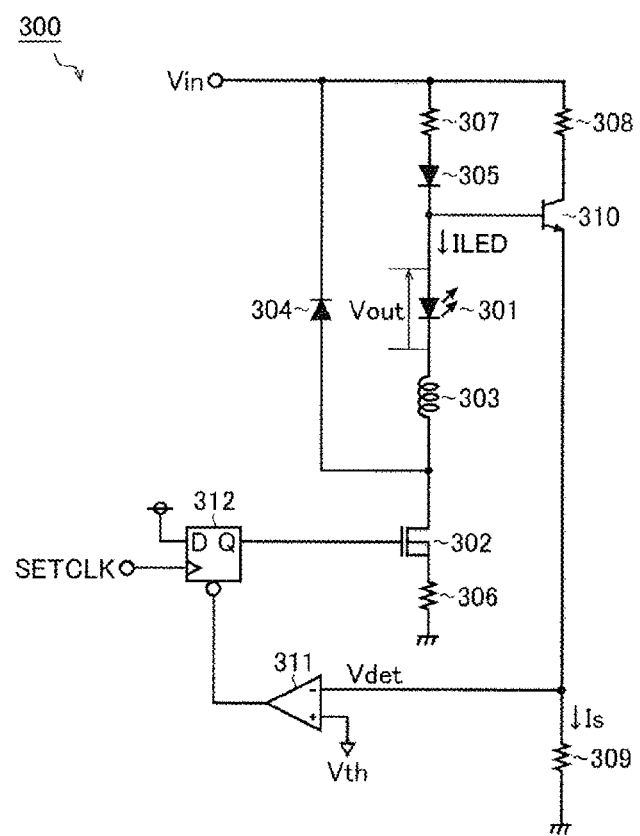
FIG. 23 is a diagram showing a second conventional example of the LED lighting appliance.
Figure 24:
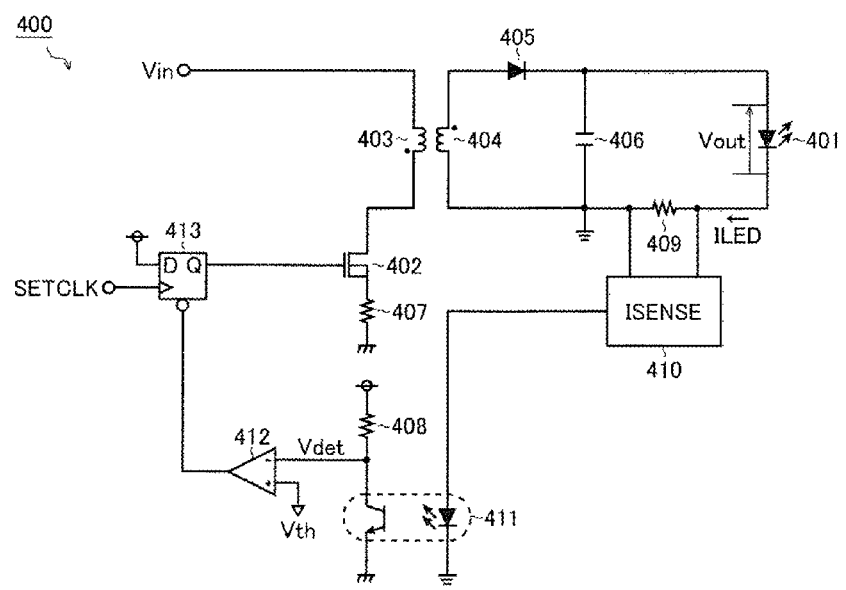
FIG. 24 is a diagram showing a third conventional example of the LED lighting appliance.

FIGS. 21A to 21C are outer appearance views showing first to third application examples of the LED lighting appliance X, respectively. FIG. 21A shows a light bulb-shaped LED lamp X1, an annular LED lamp X2, and a straight tube-shaped LED lamp X3. Furthermore, FIG. 21B shows an LED ceiling light X4, and FIG. 21C shows an LED downlight X5. These are all shown as illustrative examples, and the LED lighting appliance X can be used in a wide variety of forms.

<Other Modified Examples>

While the foregoing embodiment has been described by taking, as an example, a light emitting diode driving device that performs switching control of an output current flowing through a light emitting diode, there is no limitation thereto, and the present invention is also applicable broadly to load driving devices that perform switching control of an output current flowing through other types of loads (for example, an organic electro-luminescence element).

Furthermore, in addition to the foregoing embodiment, various modifications of the present invention are possible without departing from the spirit of the technical idea of the present invention. That is, the foregoing embodiment is to be construed in all respects as illustrative and not limiting. The technical scope of the present invention is indicated by the appended claims rather than by the foregoing description of the embodiment, and it is to be understood that all changes that come within the meaning and range of equivalency of the claims are embraced therein.

Industrial Applicability

The present invention is applicable to, for example, a light emitting diode driving device that performs switching control of an output current flowing through a light emitting diode.

LIST OF REFERENCE NUMERALS 1 light emitting diode driving device (load driving device)
2 light emitting diode (load)
10 semiconductor device
11 regulator
12 logic portion
121 switch control circuit
121a timing controller
121b NOR gate
121c D flip-flop
122 computation circuit
122a multiplier
122b divider
123 ADC/DAC control circuit
124 dimming control circuit
13 oscillator
14 driver
15 to 17 comparator
18 DA converter
19 AD converter
191, 192 sample/hold circuit
193 AD conversion circuit
194 input selection circuit
20 interface portion
21 memory portion
PW commercial alternating current power source
DB diode bridge
R1 to R8 resistor
C1 to C6 capacitor
D1 to D3 diode
ZD1 Zener diode
L1 to L5 coil
N1 N-channel type MOS field-effect transistor (switch)
WL1 to WL4, WLa, WLb wiring layer
X LED lighting appliance
X1 light bulb-shaped LED lamp
X2 annular LED lamp
X3 straight tube-shaped LED lamp
X4 ceiling light
X5 downlight

What is claimed is:

1. A load driving device, comprising:
   a switch for performing switching control of an output current flowing through a load;
   a driver that performs on/off control of the switch in accordance with a switch control signal;
   a comparator that compares a current detection voltage corresponding to a sense current flowing through the switch with a current peak setting voltage, and based on a result of the comparison, generates a current peak detection signal;
   an AD converter that converts the current detection voltage into a current detection signal;
   a DA converter that converts a current peak setting signal into the current peak setting voltage; and
   a logic portion that, upon receiving inputs of the current peak detection signal and the current detection signal, outputs the switch control signal and the current peak setting signal,
   wherein the logic portion includes a computation circuit that calculates a signal value of the current peak setting signal by using a computation equation expressed by $Y1 = AVE \times \alpha + \Delta \times Ton/2$, where a signal value of the current peak setting signal is denoted as $Y1$, an average current set value of the output current as AVE, an adjustment coefficient for the average current set value as $\alpha$, an on period of the switch as Ton, and a change rate of the current detection signal in the on period of the switch as $\Delta$, and
   the computation circuit determines the adjustment coefficient in accordance with a computation mode setting signal.

2. The load driving device according to claim 1, wherein the computation circuit determines whether or not a ratio between a switching cycle of the switch and an off period of the switch should be included in the adjustment coefficient in accordance with whether an insulated type or a non-insulated type is used.

3. The load driving device according to claim 1, wherein the computation circuit determines whether or not a power factor correction coefficient should be included in the adjustment coefficient in accordance with whether power factor control is enabled or disabled.

4. The load driving device according to claim 3, wherein the power factor correction coefficient is a variable value that changes following a same behavior as that of an input voltage.

5. The load driving device according to claim 4, wherein variable control of the power factor correction coefficient is performed so that, without depending on a variation in the input voltage, the power factor correction coefficient always has a mean value of 1.

6. The load driving device according to claim 1, wherein the AD converter includes:
   first and second sample/hold circuits that sample/hold input values at different timings from each other; and
   a single AD conversion circuit that sequentially performs AD conversion of respective output values of the first and second sample/hold circuits.

7. The load driving device according to claim 1, wherein the computation circuit includes one multiplier and one divider and, at every switching cycle of the switch, calculates a signal value of the current peak setting signal, with the multiplier and the divider operated at respective timings allotted thereto by timing sharing.

8. The load driving device according to claim 1, wherein the computation mode setting signal is set within a package through terminal processing in the logic portion.

9. The load driving device according to claim 1, further comprising:
   an external terminal for accepting an external input of the computation mode setting signal.

10. The load driving device according to claim 1, further comprising:
    an interface portion that performs signal transmission and reception with an exterior; and
    a memory portion that stores the computation mode setting signal eternally inputted via the interface portion.

11. The load driving device according to claim 1, wherein the computation circuit determines whether or not a second term on a right side of the computation equation should be validated in accordance with whether a continuous current mode or a quasi-resonant mode is selected.

12. The load driving device according to claim 11, wherein the computation circuit perceives whether the continuous current mode or the quasi-resonant mode is selected in accordance with whether or not a switching frequency of the switch is set to a zero value.

13. The load driving device according to claim 1, wherein the load is a light emitting diode.

14. The load driving device according to claim 13, wherein the computation circuit determines whether or not a dimming coefficient should be included in the adjustment coefficient in accordance with whether dimming control is enabled or disabled.

15. The load driving device according to claim 14, wherein the logic portion includes a dimming control circuit that performs burst dimming or linear dimming of the light emitting diode in accordance with a dimming signal.

16. The load driving device according to claim 15, wherein the dimming control circuit accepts inputs of, as the dimming signal, a PWM (pulse width modulation) diming signal, a linear dimming signal, and a phase dimming signal.

17. The load driving device according to claim 15, wherein at a time of burst dimming, after setting the dimming coefficient to 1, the dimming control circuit performs lighting-up and extinguishing control of the light emitting diode at an on-duty corresponding to the dimming signal, while at a time of linear dimming, after setting the dimming coefficient to a value corresponding to the dimming signal, the diming control circuit fully switches on the light emitting diode.

18. An LED lighting appliance, comprising:
a light emitting diode; and
the load driving device according to claim 13, which performs switching control of an output current flowing through the light emitting diode.

19. The LED lighting appliance according to claim 18, wherein
the LED lighting appliance is a light bulb-shaped LED lamp, an annular LED lamp, a straight tube-shaped LED lamp, a ceiling light, or a downlight.

* * * * *